(12) United States Patent
Tippmann

(10) Patent No.: US 12,263,510 B2
(45) Date of Patent: Apr. 1, 2025

(54) MULTIPURPOSE UNDERGROUND TOOL

(71) Applicant: Jesse Tippmann, Piedmont, SD (US)

(72) Inventor: Jesse Tippmann, Piedmont, SD (US)

( * ) Notice: Subject to any disclaimer, the term of this patent is extended or adjusted under 35 U.S.C. 154(b) by 535 days.

(21) Appl. No.: 17/565,362

(22) Filed: Dec. 29, 2021

(65) Prior Publication Data
US 2023/0201892 A1    Jun. 29, 2023

(51) Int. Cl.
*H04N 7/18* (2006.01)
*B08B 9/032* (2006.01)
*B08B 9/043* (2006.01)
*B08B 13/00* (2006.01)

(52) U.S. Cl.
CPC ............ *B08B 9/043* (2013.01); *B08B 9/0325* (2013.01); *B08B 13/00* (2013.01); *H04N 7/183* (2013.01); *B08B 2209/032* (2013.01); *B08B 2209/04* (2013.01)

(58) Field of Classification Search
CPC ....... B08B 9/043; B08B 9/0325; B08B 13/00; B08B 2209/032; B08B 2209/04; H04N 7/183; H04N 7/185
USPC ... 15/88, 88.4, 104.05, 316.1, 344, 405, 406
See application file for complete search history.

(56) References Cited

U.S. PATENT DOCUMENTS

| 4,348,922 | A | 9/1982 | Harris et al. |
| 8,147,085 | B2 | 4/2012 | Pieren |
| 2009/0260180 | A1 * | 10/2009 | Meredith ................. F23J 3/026 |
| | | | 15/406 |
| 2015/0323098 | A1 | 11/2015 | Smith et al. |
| 2018/0272394 | A1 * | 9/2018 | Sieburg ................. B08B 9/0328 |

FOREIGN PATENT DOCUMENTS

| CN | 103802057 | 5/2014 |
| CN | 204800533 | 11/2015 |
| CN | 103170939 | 3/2016 |
| DE | 19951031 | 12/2000 |
| DE | 102014012624 | 3/2015 |
| EP | 2857146 | 9/2016 |
| JP | 4817823 | 11/2011 |

* cited by examiner

*Primary Examiner* — David Redding
(74) *Attorney, Agent, or Firm* — Tracy Parris

(57) ABSTRACT

A multipurpose underground tool may be compact, universal, multi-purpose and/or reconfigurable. A variety of underground equipment in a variety of conditions at a variety of depths with a variety of operating interfaces may be remotely viewed, cleared of obstructions and controlled with one tool that may be reduced in size. A portable computer (e.g., cell phone) may power a lighted camera, display images of underground conditions to assist a user with operations (e.g., clear obstructions, maneuver, steer, attach to and operate underground equipment) and/or provide a user interface. Accessories may be adjusted, added or removed to accomplish a variety of tasks in a variety of conditions. Integrated, detachable, fixed or adjustable accessories may include a display holder, an ejector, a retriever, a debris deflector, a debris collector, a pressure tank, a pressure hose, actuators and/or other pole tips (e.g., with one or more accessories), pole sections, handles and/or accessory controls.

20 Claims, 5 Drawing Sheets

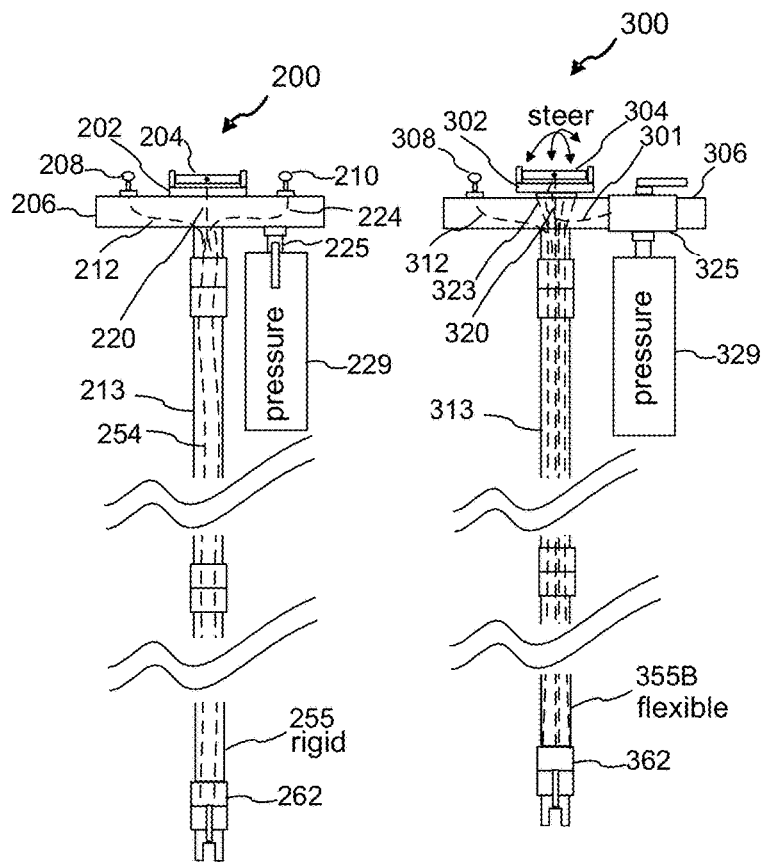
FIG. 2   FIG. 3   FIG. 4
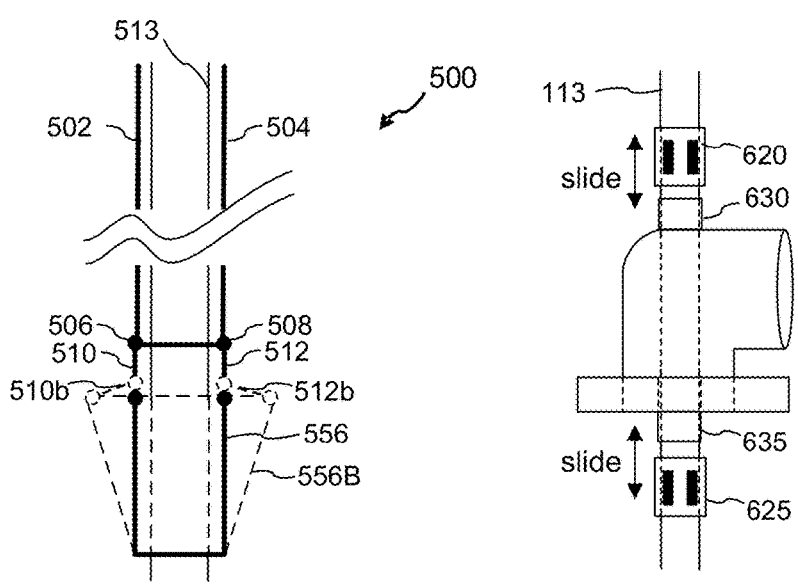
FIG. 5   FIG. 6

MULTIPURPOSE UNDERGROUND TOOL

BACKGROUND

Underground equipment, such as a curb stop valve, is accessible through a confined space, such as a small diameter pipe, leading (e.g., deep) underground to an (e.g., a relatively small) access box positioned around the equipment. An underground equipment worker may carry around multiple long tools to control each type of underground equipment, which may have different dimensions. Access to and operation of underground equipment may be difficult, for example, when access lids, pipes, and/or equipment are damaged and/or when the ground has shifted an access pipe or box relative to the equipment. Lids and pipes may be damaged for years before being discovered. These problems may lead to a variety of obstructions (e.g., dirt, rocks, foliage, paper, pipe, broken pieces of lid or pipe) falling into an access pipe or box. Obstructions, access pipe or box shifts or damage may interfere with underground work. A worker may be unable to observe underground equipment or perform work without the assistance of a cleaning truck or excavation, leading to additional costs and delays.

SUMMARY

This Summary is provided to introduce concepts in a simplified form. These concepts are described in greater detail below in the sections entitled Detailed Description, Brief Description of the Drawings, Claims, and in the figures. This Summary is not intended to identify key or essential features of the described or claimed subject matter, nor limit the scope thereof.

Systems, methods, and instrumentalities are disclosed for a multipurpose underground tool that may be compact, universal, multi-purpose and/or reconfigurable. A variety of underground equipment in a variety of conditions at a variety of depths with a variety of operating interfaces may be remotely viewed, cleared of obstructions and controlled with one tool that may be broken down and stored in a compact case. A portable computer (e.g., an operator's cell phone), which may be held by the tool, may be used to power a lighted camera recessed in an actuator (e.g., valve key) and to display images of underground conditions provided by the camera, which may assist a user with operations (e.g., clear obstructions, maneuver, steer, attach to and operate underground equipment). Accessories may be adjusted, deployed/retracted, added or removed to accomplish a variety of tasks in a variety of conditions. Integrated, detachable, fixed or adjustable accessories may include, for example, a display holder, an ejector, a retriever, a debris deflector, a debris collector, a pressure tank, a pressure hose, actuators and/or other pole tips (e.g., with one or more accessories), pole sections, handles and/or accessory controls. Controls may be manual and/or automated.

BRIEF DESCRIPTION OF THE DRAWINGS

The drawings, summary, detailed description and claims individually and collectively present non-limiting examples. Each figure represents a different example with different numbering.

FIG. 2 shows an example of a multipurpose underground tool, according to an embodiment.

FIG. 3 shows an example of a multipurpose underground tool, according to an embodiment.

FIG. 4 shows an example of a multipurpose underground tool, according to an embodiment.

FIG. 5 shows an example of a retractable collector, according to an embodiment.

FIG. 6 shows an example of a removable and repositionable debris deflector, according to an embodiment.

DETAILED DESCRIPTION

Figure 1:
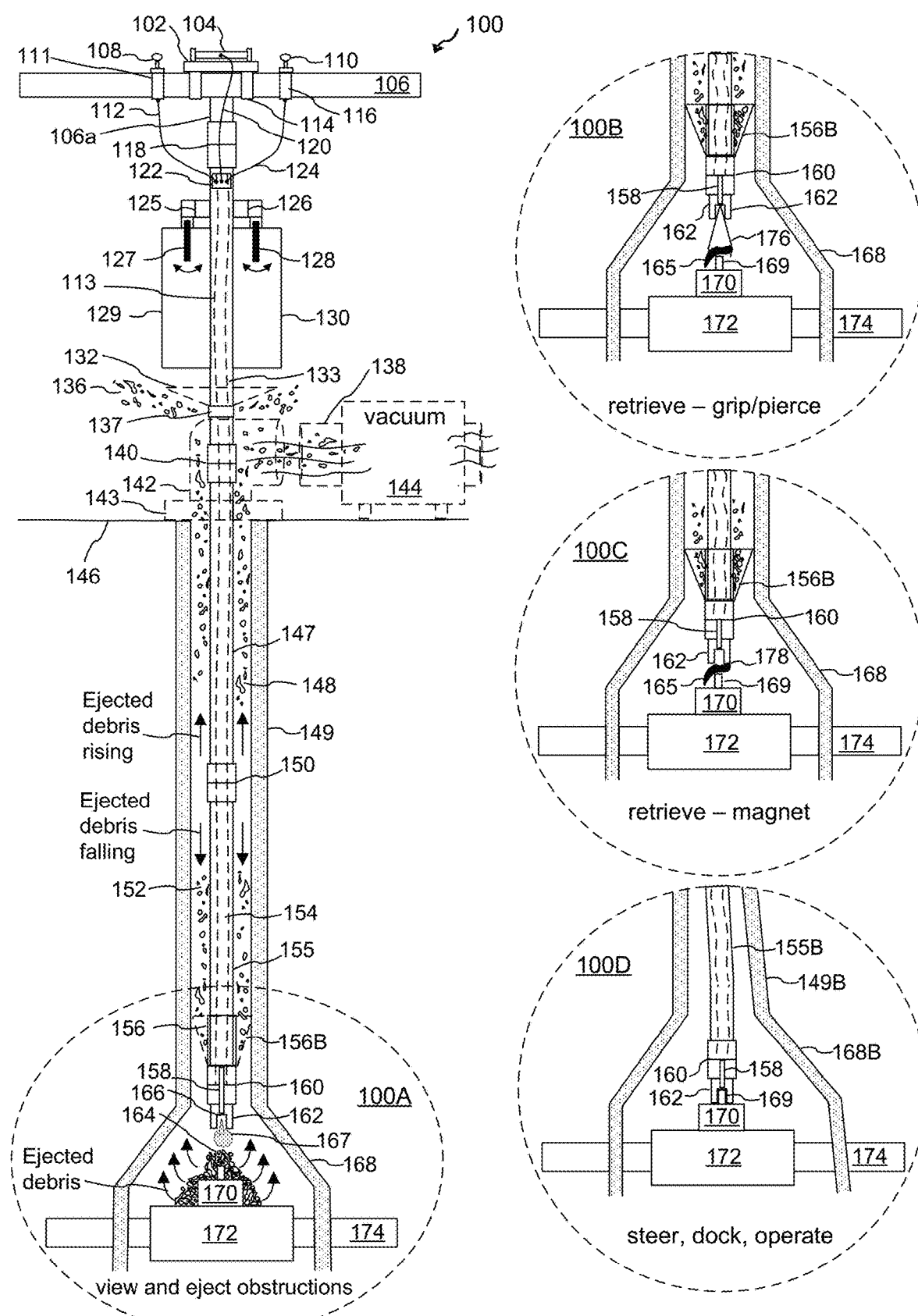
FIG. 1 shows an example of a multipurpose underground tool, according to an embodiment.

A detailed description of illustrative embodiments will now be described with reference to the various Figures. Although this description provides examples of possible implementations, it should be noted that details provided in examples are intended to be exemplary and in no way limit the scope of the application. The present technology may be practiced without these specific details. The present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, methods, procedures, components, circuits, etc. known to those of ordinary skill have not been described in detail as not to unnecessarily obscure aspects of the embodiments presented.

References in the specification to "embodiment," "example embodiment," or the like, indicate that the embodiment described may include a particular feature, structure, characteristic or step, but every embodiment may not necessarily include the particular feature, structure, characteristic or step. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Certain terms are used throughout the following description and claims to refer to particular system components and configurations. As one skilled in the art will appreciate, various skilled artisans and companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . ." Also, the terms "attached" and "coupled" are intended to mean either an indirect or direct connection.

Systems, methods, and instrumentalities are disclosed for a multipurpose underground tool that may be compact, universal, multi-purpose and/or reconfigurable. A variety of underground equipment in a variety of conditions at a variety of depths with a variety of operating interfaces may be remotely viewed, cleared of obstructions and controlled with one tool that may be broken down and stored in a compact case. A portable computer (e.g., an operator's cell phone), which may be held by the tool, may be used to power a lighted camera recessed in an actuator (e.g., valve key) and to display images of underground conditions provided by the camera, which may assist a user with operations (e.g., clear obstructions, maneuver, steer, attach to and operate underground equipment). Accessories may be adjusted, deployed/retracted, added or removed to accomplish a variety of tasks in a variety of conditions. Integrated, detachable, fixed or adjustable accessories may include, for example, a display holder, an ejector, a retriever, a debris deflector, a debris collector, a pressure tank, a pressure hose, actuators and/or other pole tips (e.g., with one or more accessories), pole sections, handles and/or accessory controls. Controls may be manual and/or automated.

FIG. 1 is an example of a multipurpose underground tool, in accordance with an embodiment. FIG. 1 shows a multipurpose underground tool that may be used, for example, to view conditions, eject obstructions, deflect debris, collect debris, retrieve magnetic and non-magnetic obstructions, steer an actuator to dock with and/or operate an underground component (e.g., configured as an interface to operate underground equipment). FIG. 1 shows an example of underground tool 100 inserted under surface 146 (e.g., sidewalk, lawn, road) in access pipe 149 down to access box 168 (e.g., curb stop box) to access an underground component (e.g., operable valve nut 169 on valve stem 170 of curb stop valve 172 controlling flow in pipe 174). The cutaway view in FIG. 1 shows access box 168 with obstructions 164 obstructing valve nut 169 in order to describe features of underground tool 100.

Access pipe 149 and access box 168 provide a confined area to access and perform operations on an operable component of underground equipment without excavation. Access pipe 149 may be covered by a lid (not shown). A lid (e.g., when intact) may be removed from the top of access pipe 149. Dimensions of access pipe 149 and access box 168 may vary. In an example, an interior diameter of access pipe may be less than three inches. A lid, access pipe 149 and access box 168 may comprise any material. In an example, a lid, access pipe 149 and access box 168 may comprise iron or plastic.

Pipe 174 and curb stop valve 172 may provide a controllable conduit, for example, for a vapor (e.g., natural gas) or a liquid (e.g., water). Pipe 174 and curb stop valve 172 may have a wide variety of dimensions (e.g., diameters), for example, for compliance with a wide variety of flow and flow control specifications. Valve 172, valve stem 170 and valve nut 169 may comprise any material. In an example, valve 172, valve stem 170 and valve nut 169 may comprise brass. Valve stem 170 and valve nut 169 may have a variety of dimensions and shapes. Valve nuts (e.g., valve nut 169) may be operated (e.g., turned) to control (e.g., open, close) valves (e.g., valve 172), for example, by one or more variable and/or a variety of fixed actuators (e.g., actuator 162). An actuator may comprise, for example, a fitting (e.g., key) that mates with a valve nut.

Underground tool 100 may comprise, for example, user interface 106, pole 113 and actuator 162, with or without one or more accessories, e.g., lighted camera 158, display 104, first control 108, second control 110, first tank 129, second tank 130, pressure ejector 166, first deflector 132, second deflector 142 and/or collector 156. Each of a wide variety of implementations may comprise any number of these and/or other accessories or components.

User interface (e.g., handle) 106 may serve several functions, such as (e.g., manual) control of actuator 162, as an accessory platform (e.g., user interface), as a pressure conduit, as a wire and cable conduit, protective shield, etc. Control of an actuator may comprise, for example, manually rotating handle 106 to rotate actuator 162 and underground component 169 and/or resisting rotation of handle 106 during automated control of an active (e.g., motorized) actuator 162. Handle 106 may comprise any material suitable for forces exerted on, in or by handle 106 (e.g., pure or alloy materials, such as iron, steel, aluminum, carbon fiber). Handle 106 may be any length (e.g., 30 inches). Handle 106 may have any width or diameter. Handle 106 may have grips. Handle 106 may be fixed length or variable length. Handle 106 may be configured to telescope, fold and/or may be configured (e.g., with connectors or couplers) for one or more segments to be added and/or removed. Handle 106 may have one or more segments and none or more couplers configured to connect and disconnect (e.g., couple and decouple, lock and unlock) handle segments. Handle 106 or one or more segments thereof may be completely or partially solid (e.g., bar) and/or hollow (e.g., pipe). Handle 106 may have any shape (e.g., elongated, uniform, irregular, flattened, rectangular, curved, dished or concave). In an example, handle 106 may be configured to provide multiple grips (e.g., to lift, push, turn and otherwise manipulate underground tool 100).

User interface (e.g., handle) 106 may have any cross section shape (e.g., round, square, regular polygon, irregular polygon). In an example, handle 106 may have angled or perpendicular protrusions (e.g., grips), not shown, extending upward and/or downward (e.g., from the ends of handle 106). Handle 106 may be fixed to or removable from pole 113. In an example, handle 106 may be configured with a stem 106a joined or configured to be joined to first pole coupler 118, which may be used to assemble and disassemble handle 106 and pole 113. In an example, handle 106 may be removed from pole 113. Handle 106 may be tethered to pole 113, for example, by a sheath, operable cable(s), tether cable(s) and/or wire(s), which may be inside and/or outside pole 113 and handle 106. In an example, handle 106 may be swapped for other handles (not shown), such as longer handles to induce more torque or a handle that may be driven by a mechanical (e.g., rotational) device. In an example, handle 106 may comprise handle segments (e.g., right, left) that attach to the top of pole 113 (e.g., tee shaped top of pole 113). Handle 106 may be segmented or separable from pole, for example, to support breakdown and compact storage or protection (e.g., as shown by example in FIG. 8).

One or more accessories may be integrated with or coupled to (e.g., inside and/or outside) handle 106 or handle segments. In an example (e.g., as shown in FIG. 1), handle 106 may be configured with display holder 102, which may hold display 104 (e.g., computing device with a display, such as a cellular phone or tablet computer). Display holder 102 may be fixed or variable (e.g., adjustable, direction, tilt, rotation, slide to position or fit, removable). In an example, display holder 102 may comprise a recess or compartment integrated with or attached to handle 106 (e.g., a wide handle with a recessed center). Display holder 102 may have a lid/cover, for example, to protect a display left attached to underground tool 100. Display holder 102 may be variable (e.g., adjustable). In an example, display holder 102 may slide, spin and/or rotate in one or more dimensions, for example, to orient display 104 for user viewing. Display holder 102 may hold display 104, for example, by clamp and/or strap. Display holder 102 may comprise, for example, slide spring-loaded clamp jaws to adapt to various dimensions of displays. Display holder 102 may comprise, for example, a cell phone mount (e.g., to a bike), such as a JDIBest™ Bike Phone Mount, a Vibrelli® Universal Bike Phone Mount, a RAM Mounts® Tough-Claw Mount™ with Universal X-Grip® phone mount, etc.

Display 104 may be fixed to or removable from display holder 102. Display 104 (e.g., a computer) may serve multiple purposes, such as to provide power, communication, processing, user interface, display and so on. For example, display 104 may be coupled to camera cable 120, for example, to provide power to lighted camera 158 and to receive still or video images from lighted camera 158. As shown by example in FIG. 9, the computer may execute an underground tool program (UTP). Display 104 may display a UTP graphical user interface (GUI). A UTP GUI may display camera images and/or a menu for a user to selectively control one or more of camera settings and operation, the display of images from the camera, settings and/or operation of the actuator, settings and/or operation of the ejector, settings and/or operation of the retriever, settings and/or operation of the collector, and/or settings and/or operation of pole and/or actuator steering.

Display holder 102 may be coupled to handle 106, for example, by display mount 114. Handle 106 may be configured with first control 108. First control 108 (e.g., retriever control, steering control, collector control) may be coupled to handle 106, for example, by first mount 111. Handle 106 may be configured with second control 110. Second control 110 (e.g., retriever control, steering control, collector control) may be coupled to handle 106, for example, by second mount 116. Mounts (e.g., display mount 114, first mount 111, second mount 116) may be fixed or removable and may couple or mount to handle 106, for example, by clamp, weld, friction fit, adhesive, fastener(s) or other fixed or removable mounts. In an example, handle 106 or handle segments may be configured (e.g., inside and/or outside) with, for example, one or more handle and/or pole couplers, segment retention cables or chords (e.g., solid or hollow sheaths), pressure couplers (e.g., when handle provides pressure conduit for a pressure source), sheaths, control wires and/or cables (e.g., first and second cables 112, 124), wire and/or cable terminations, camera cables (e.g., camera video and power cable 120).

Pole 113 may provide reach and mechanical force (e.g., torque) conveyance between handle 106 and actuator 162. Pole 113 may comprise any material suitable for forces exerted on, in or by pole 113 (e.g., pure and/or alloy materials, such as iron, steel, aluminum or carbon fiber). Pole 113 may be any length (e.g., eight feet). Pole 113 may be fixed length or variable length. In an example, pole 113 may telescope (e.g., with one pole inside another) and/or the number and/or length of segments may be variable, e.g., by adding or removing segments. Pole 113 may have any width or diameter that fits inside one or more underground equipment access pipes. Pole 113 may have one or more segments (e.g., discrete or telescoping sections) and none or more couplers configured to connect and disconnect (e.g., assemble and disassemble or lock and unlock) pole segments. Pole 113 or one or more segments thereof may be completely or partially solid (e.g., bar), hollow (e.g., pipe), and/or may have a honeycomb or other structural fill. Pole 113 may have any cross section shape (e.g., round, square, regular polygon, irregular polygon). In an example (e.g., as shown in FIG. 1), pole 113 may be segmented, for example, to support breakdown and compact storage and protection (e.g., as shown by example in FIG. 8). In an example, pole 113 may comprise a pipe with first, second and third segments 133, 147, 155, which may be coupled and decoupled (e.g., broken down), respectively, by second and third pole couplers 140, 150.

One or more accessories may be integrated with or coupled to (e.g., inside and/or outside) pole 113 or pole segments 133, 147, 155. In an example, third pole segment 155 may comprise a rigid pipe section and/or flexible/steerable pipe section 155B (e.g., as shown in example 100D). In an example, pole 113 or first through third pole segments 133, 147, 155 may be configured with first through fourth pole couplers 118, 140, 150, 160, pressure couplers 125 and 126 (e.g., configured to couple to first and second tanks 129, 130, pressure hose and/or other pressure source), cable termination 122, first deflector 132, second deflector 142 (e.g., with or without vacuum 144), sheath 154 and/or collector 156 (e.g., as retracted or undeployed collector 156 or deployed collector 156B), actuator 162, ejector 166, and/or accessories that may be coupled to handle 106 or pole 113. An accessory mountable to handle 106 may be (e.g., alternatively or additionally) mountable to pole 113, for example, with or without an adaptor, positioning device or pole segment.

One or more accessories, wires, cables, sheaths, tubes or components may be coupled to or on (e.g., along) or confined by the exterior and/or interior of pole 113, handle 106 or one or more segments thereof. In an example, an interior and/or exterior of pole 113 and/or handle 106 may comprise, for example, sheath 154, power wire(s) or cable(s) (e.g., camera video and power cable 120), communication wire(s) or cable(s) (e.g., camera video and power cable 120), retrieve control wire(s) or cable(s) (e.g., first or second control cable 112, 124), steering control wire(s) or cable(s) (e.g., first or second control cable 112, 124), ejector pressure tube(s) and/or other wire(s), cable(s), tube(s) and/or component(s) (e.g., transceiver, power supply, steering servo, retriever piston, collector piston, actuator servo, ejector valve). A sheath (e.g., sheath 154) may partially or completely shroud (e.g., encircle) one or more wires, cable and/or tubes (e.g., as shown by example in FIG. 5). A sheath may be inside pole 113 or may be coupled (e.g., clamped, banded, zip tied) to exterior of pole 113, handle 106 or one or more segments thereof. In an example, accessories, wires, cables, sheaths, tubes or components may be flexible, removed, disconnected, etc., for example, to support compact storage.

Figure 8:
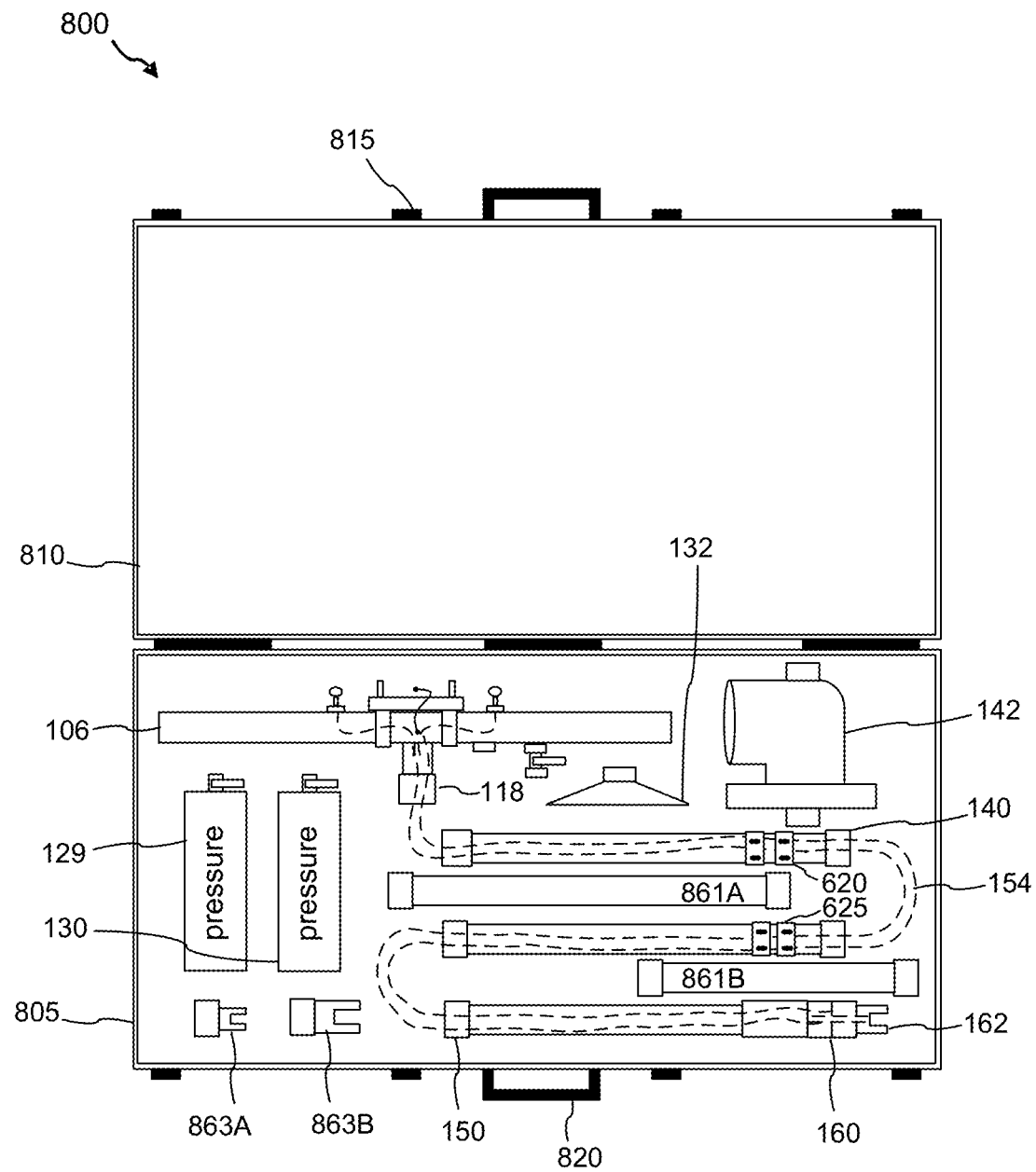
FIG. 8 shows an example of compact storage of a disassembled underground tool, according to an embodiment.

Sheath 154 may serve multiple purposes, such as confinement and/or protection of wires, cables, springs, rods, etc., with or without (e.g., also) providing retention of pole segments and handle when disassembled (e.g., as shown by example in FIG. 8). Sheath 154 may comprise, for example, an open, closed, closable (e.g., zippered) sleeve. Sheath 154 may comprise any material and construction suitable for rigidity, flexibility and/or other conditions for an implementation (e.g., fixed length pole, segmented pole). Sheath 154 may comprise, for example, fabric, braided or woven yarn, fiber or filament comprising, for example, stainless steel, Nylon, Ballistic Nylon, Polyester, Polyethylene Terepthalate (PET), Silica, Fiberglass, Basalt or Polyaramid Polymetaphenylene Isophthalamide. Sheath 154 may be mounted inside and/or outside handle 106, pole 113 and actuator 162. In an example, sheath 154 may shield one or more of power and/or communication wire(s) or cable(s), retrieve control wire(s) or cable(s), steering control wire(s) or cable(s) and/or one or more other control, power or communication wire(s) or cable(s). Sheath 154 may confine and/or protect, for example, first control cable 112, second control cable

124, lighted camera cable 120 and/or other control wires, cables, springs, rods, etc. There may be any number of cables, wires, linkages, etc. inside and/or outside sheath 154. Sheath 154 and/or (e.g., alternatively) a cord, wire or cable may operate to keep disassembled first, second and third pole segments 133, 147, 155 together with or without handle 106, for example, as shown by example in FIG. 8.

Actuator 162 may be configured or configurable to operate underground equipment, for example, by moving an underground component. An example of an underground component may be, for example, operable valve nut 169 on valve stem 170 of curb stop valve 172 controlling flow in pipe 174. Valve nut 169 may be moved (e.g., rotated), for example, by actuator 162, to control flow in pipe 174. Force applied to actuator 162 may be manual and/or automated. Manual force may be applied, for example, by applying force to (e.g., turning) handle 106, which, in turn, may apply (e.g., rotational) force to pole 113 and actuator 162. Force may be automated, for example, by an electromechanical, hydraulic or pneumatic device coupled to actuator 162, pole 113 and/or handle 106. In an example, an electrical, hydraulic or pneumatic servo may be integrated in or coupled to actuator 162 and controlled by a user (e.g., by a servo control on handle 106, pole 113 or elsewhere, such as a UTP GUI control). Actuator 162 may comprise, for example, a thread-on, pin lock, quick connect (QC) or other coupler to pole 113 and/or to fourth coupler 160.

Actuator 162 may be fixed or variable, e.g., in terms of shape(s), size(s), pattern(s). In an example, an actuator may comprise a shape keyed to fit an underground component (e.g., a mated fit). For example, an underground component may comprise a raised (e.g., head or nut) portion while an actuator may comprise a slotted, socket or jaws portion that fits multiple sides of the raised portion, e.g., in order to fit and impart mechanical or other force. A variable actuator may be used, for example, to control multiple types of underground components that may vary in size, shape and/or pattern. An actuator may be varied, for example, by manually or automatically changing shape (e.g., narrowing or widening spacing of jaws). Actuator variation may be controlled, for example, by a control on a handle (e.g., a grip, dial or button controlling a mechanical linkage, pressure in a hydraulic tube or a signal on a wire inside pole 113 leading to a servo motor coupled to one or more actuator jaws). Actuator 162 may be permanently or temporarily/removably mounted to pole 113. In an example, actuator 162 may be mounted to a coupler (e.g., fourth pole coupler 160) that may be coupled to and decoupled from pole 113. Fourth pole coupler 160 may permit actuator 162 to be removed, for example, for maintenance, replacement and/or to swap for a different actuator. Actuator 162 may comprise any material suitable for environment parameters (e.g., pressures, gases, liquids, applied forces, temperatures). In an example, actuator 162 may comprise, for example, stainless steel. Actuator 162 may comprise components, such as a body and a key, where multiple keys may be swappable onto the same body. Keys may comprise one or more cut outs or holes that align with one or more accessories, such as cameras, pressure ejector ports, retrievers and so on.

One or more accessories may be integrated with or coupled to (e.g., inside and/or outside) actuator 162, for example, as shown and discussed with greater detail in FIGS. 7A-D. An actuator may be configured, for example, for a coupler, light(s), camera(s), servo, ejector(s) (e.g., gas and/or liquid pressure port(s)), collector(s) and/or retriever(s). In an example, actuator 162 may be configured with coupler 160, lighted camera 158, ejector 166 (e.g., to view and eject obstructions as shown in call out 100A), grab or stab retriever 176 (e.g., as shown by example in call out 100B), magnetic retriever 178 (e.g., as shown by example in call out 100C) and/or flexible or steerable portion (e.g., as shown by example in call out 100D). An actuator and/or flexible portion of pole 113 (e.g., a pole tip) may be steerable (e.g., as shown in callout 100D).

There may be a variety of accessories. Accessories may be integrated, detachable, fixed or adjustable. Accessories may include, for example, a display holder, an ejector, a retriever, a debris deflector, a debris collector, a pressure tank, a pressure hose, actuators and/or other pole tips (e.g., with one or more accessories), pole sections, handles, accessory controls, etc.

Couplers 118, 125, 126, 140, 150, 160 may serve multiple purposes, such as assembly and disassembly of one or more configurations of (e.g., additional, replaceable, swappable) components, compact storage, pressure conveyance, conduit path and so on. Couplers 118, 125, 126, 140, 150, 160 may be the same or different. Couplers may comprise any type of coupler. Couplers may have any size or shape. Couplers may comprise any material, e.g., stainless steel. Coupler components may or may not be linked together (e.g., by a retainer such as a hinge or cable). In an example, a coupler may comprise a quick coupler. A coupler may be, for example, a pneumatic or hydraulic coupler, which may have a pressure rating. Pressure ratings for conduit (e.g., pipe), coupler(s) and pressure port(s) (e.g., actuator port) may be suitable for a pressure that may be applied by a pressure source (e.g., first and/or second pressure tanks 129, 130) to eject pressurized gas or liquid through one or more ports (e.g., in actuator 162). In an example, handle 106, each end of first, second and third pole segments 133, 147, 155, other segments (e.g., as shown in FIG. 8), actuator 162 and/or other actuators (e.g., as shown in FIG. 8) may be coupled to a pressure-rated coupler, such as a Dual-Lock™ P-Series Thor Interchange pneumatic coupler manufactured by Dixon Valve & Coupling Company, Inc. In an example, first and second pressure couplers 125, 126 may comprise a quick coupler for a High pressure Air (HPA) source (e.g., tank via a hose or a direct-coupled tank filled with compressed Nitrogen or air), a Carbon Dioxide ($CO_2$) source (e.g., tank via a hose or a direct-coupled tank filled with compressed liquid $CO_2$) and/or other source. Couplers may couple and decouple handle 106, pole 113 and actuator 162 and/or other components while supporting (or not interfering with) accessories they may be configured with (e.g., sheath or retention cord or cable, camera, pressure port, collector, retriever(s)).

Collars or clamps (e.g., as shown by examples in FIGS. 1, 6 and 8) may be coupled to one or more portions (e.g., segments or sections) of pole 113, for example, to stabilize, position, hold-release, couple-decouple, attach-detach, retain and/or permit movement of one or more accessories (e.g., first and second deflectors 132, 142, collector 156). Collars or clamps may be fixed or movable. Collars or clamps may be captured or retained (e.g., adjustable or fixedly attached to a pole segment) or may be removable in one or more steps. Collars or clamps may be quick release. Collars or clamps may slide (e.g., by releasing compression and/or friction fit to pole 113). Collars or clamps may be multi-purpose or specific purpose (e.g., sized and/or shaped to fit and/or retain one or more accessories). In an example, a (e.g., removable or slidable) collar or clamp may be positioned on a pole segment above and below an accessory (e.g., second deflector 142) (e.g., as shown by example in FIG. 6). In an example, one or more collars or clamps may comprise one or more holding components (e.g., expandable jaws, flexible strap(s), clamps) that may hold one or more accessories (e.g., with a single collar or clamp). An accessory or other component may be added to pole 113, for example, by positioning or relocating (e.g., sliding) one or more collars to hold the accessory or component. A collar or clamp may be configured, for example, to position an accessory, hold an accessory, retain an accessory while permitting it to move (e.g., rotate, spin, deploy, retract and so on).

Pressure source(s) may be coupled to underground tool 100, for example, when underground tool 100 is configured with one or more pressure ejectors/ports. A pressure source may be coupled to a pressure ejector by pressure conduit. Underground tool 100 may comprise internal and/or external pressure conduit. In an example, pressure conduit (e.g., flexible pressure conduit) between pressure control and pressure ejector(s)/port(s) may be mounted inside and/or outside of one or more of handle 106, pole 113 and/or ejector 162. In an example, the inside walls of one or more of handle 106, pole 113 actuator 162 and couplers (e.g., first through fourth pole couplers 118, 140, 150, 160) may be configured as pressure conduit to convey pressurized liquid or gas from a source to an ejector. First and second pressure couplers 125, 126 may (e.g., each) be coupled, for example, indirectly to a pressure source such as a pressure hose leading to a pressure source (e.g., one or more tanks or compressors). First and second pressure couplers 125, 126 may be coupled, for example, directly, to a pressure source. A pressure source may comprise pressure tank(s), such as first and second tanks 129, 130. First and second tanks 129 may be any size or shape. First and second tanks 129, 130 may supply pressurized gas or may be an expansion tank (e.g., to assist with controlling application of pressure). In an example, first and/or second tanks 129, 130 may (e.g., each) comprise a pressure bottle or tank, such as, for example, a High Pressure Air (HPA) container, which may be filled with compressed Nitrogen or air, or a Carbon Dioxide (CO2) container, which may be filled with compressed liquid CO2. In an example, first tank 129 may comprise a 13 to 125 cubic inch (CI), 3000 to 4500 psi HPA tank (e.g., manufactured by Tippmann®. Pressure ejector(s)/port(s) 166 may comprise, for example, one or more portions on or in actuator 162 (e.g., a port on either side of camera in recessed portion/channel of actuator 162). Pressure control/activation may comprise, for example, a button, handle, lever (e.g., first and second pressure control 127, 128). Pressure ejection system may comprise one or more safety features, such as an auto lock to block activation. A safety lock may be deactivated, for example, by pressing or moving a safety to permit movement of first and/or second pressure control 127, 128.

Collector(s) may be deployed on pole 113 to collect debris in access pipe 149, such as debris 152 ejected by ejector 166 and/or to catch items falling through an open access pipe 149. Collectors may be fixed or variable (e.g., deployable, retractable, resizable). In an example, retracted collector 156 may be deployed (e.g., as deployed collector 156B), for example, after ejecting pressurized gas or liquid through ejector 166 and/or while a user has underground tool 100 inserted in access pipe 149 (e.g., to catch anything that falls into access pipe 149). Underground tool 100 may be withdrawn from access pipe 149 to empty the contents of collector 156. Pole 113 may be fitted with any number of collectors. In an example, pole or one or more segments thereof, may be fitted with a series of collectors. A collector may have any shape (e.g., an inverted cup with solid or perforated/screen walls). A collector may comprise any material(s), such as flexible materials (e.g., rubber, plastic, fabric, carbon fiber) and/or rigid materials (e.g., metal, plastic). Collector(s) may be fixedly or removably attached to pole 113 or a segment thereof, for example, by one or more collars or clamps.

FIG. 5 is an example of a retractable collector, according to an embodiment. Collector 556 mount to pole 513 may be fixed or variable (e.g., removable, repositionable). Collector 556 may be deployed automatically or manually by a user interacting with a control. A control (e.g., button, knob, lever, UTP GUI) may be coupled (e.g., mechanically, electrically or electromechanically) to one or more collectors. In an example, collector 556 may be coupled to control rods 502, 504. A user may deploy and retract collector 556, for example, by causing control rods 502, 504 to push and pull (e.g., or vice versa) or rotate (e.g., twist) clockwise and counterclockwise (e.g., or vice versa). In an example, control rods 502, 504 may be segmented with hinge points 506, 508. Lower segments 510, 512 may have a retracted position and a deployed position (510b, 512b). Lower segments 510, 512 may cause collector 556 to deploy (556b) and retract as hinge points 506, 508 are pushed down and pulled up. In some examples, a user may use a UTP GUI to control a piston or servo coupled to collector linkages to deploy and retract one or more collectors.

Deflectors may deflect or steer debris. One or more deflectors may be used to deflect or steer debris removed from an access pipe. Deflectors may mount to or may surround part or all of pole 513. Deflectors may be fixed or variable (e.g., removable, repositionable). Deflectors may be fixed, variable, deployed automatically or manually by a user interacting with a control. A control (e.g., button, knob, lever, UTP GUI) may be coupled (e.g., mechanically, electrically or electromechanically) to one or more deflectors. In some examples, a user may use a UTP GUI to control a piston or servo coupled to deflector linkages to deploy and retract one or more deflectors. The example shown in FIG. 1 presents two examples, first deflector 132 and second deflector 142.

First deflector 132 may be configured (e.g., shaped, sized), for example, to deflect or steer debris 136 that may be ejected from access pipe 168 by ejector 166, for example, when pressurized air, gas or liquid is ejected in access pipe 149. Deflector shape may be fixed or variable (e.g., deployable in one or more increments, retractable, resizable). First deflector 132 may be configured or shaped (e.g., as an inverted cone or other configuration/shape) to permit debris to continue traveling upward while directing, steering or deflecting debris away from a user operating underground tool 100. First deflector 132 may be implemented with any material(s) suitable to its purpose (e.g., to deflect or steer ejected debris). In an example, first deflector 132 may comprise rubber, plastic, metal, nylon and/or other suitable rigid and/or flexible material(s) configured to absorb, dampen, steer or deflect exhaust and/or debris. Deflector size may be fixed or variable. In an example, cone angle and/or diameter may be increased and decreased (e.g., deployed and retracted for compact storage). Position, size (e.g., diameter) and/or shape (e.g., incremental deployment or retraction) changes may occur, for example, by (e.g., manual or automated) rotating, twisting, pulling, pushing or other action. In an example, twisting a deflector may change its diameter. In an example, first deflector 132 deflection angle and diameter may be adjusted, for example, by sliding a collar on pole 113 to open or close an inverted cone (e.g., similar to opening and closing an umbrella). First deflector 132 may be permanently or removably mounted to pole 113 or a segment thereof. First deflector 132 position on pole 113 or segment thereof may be fixed or variable, for example, to adjust a position of first deflector 132 above surface 146 for different lengths of pole 113 underground (e.g., for different depths of operable components). In an example, first deflector 132 or a collar, clamp or other deflector mount may slide up and down or otherwise move position on pole 113 or segment thereof. Moving a collar, clamp or other mount may operate to move (e.g., position, reposition), deploy, retract, resize and/or reshape first deflector 132.

Second deflector 142 may be configured (e.g., shaped), for example, to deflect or steer debris 136 (e.g., ejected from access pipe 168 by ejector 166, which may comprise one or more pressure ports). Deflector shape may be fixed or variable. Second deflector 142 may, for example, have a shape that steers debris in a general direction and/or in a confined area, which may support capturing debris (e.g., in a net or vacuum 144). Second deflector 142 may be implemented with any material(s) suitable to its purpose (e.g., to deflect or steer ejected debris). In an example, first deflector 132 may comprise rubber, plastic, metal, nylon and/or other suitable rigid and/or flexible material(s) configured to absorb, dampen, steer or deflect exhaust and/or debris. Deflector size may be fixed or variable. In an example, a shape (e.g., deflection angle) and/or size (e.g., exhaust diameter) may be increased and decreased (e.g., deployed and retracted for compact storage). Position, size and/or shape changes may be implemented, for example, by (e.g., manual or automated) rotating, twisting, pulling, pushing or other action. In an example, second deflector 142 may be permanently or removably mounted to pole 113 or a segment thereof. Second deflector 142 position on pole 113 or segment thereof may be fixed or variable, for example, to adjust a position of second deflector 142 above surface 146 for different lengths of pole 113 underground (e.g., for different depths of operable components). In an example, second deflector 142 or a collar, clamp or other deflector mount may slide up and down or otherwise move position on pole 113 or segment thereof (e.g., as shown by example in FIG. 6). Second deflector 142 may be configured to seal to a surface (e.g., surface 146) or otherwise minimize air or debris leakage outside of a configured debris deflection path.

FIG. 6 is an example of a removable and repositionable debris deflector, according to an embodiment. Multi-part deflector 600 may comprise multiple pieces (e.g., first half 610 and second half 615), which may be assembled and disassembled (e.g., separated and pressed together, such as around pole 113). First and second halves 610, 615 may have edges 605 that fit together (e.g., sinusoidal, square or rectangular protrusions and depressions aligned or keyed to fit together). First and second halves 610, 615 may comprise upper and lower pole adapters 630, 635 that fit to pole 113. FIG. 6 shows side and top views of first and second halves 610, 615 pressed together around pole 113. Multi-part deflector 600 may fixedly or variably attach (e.g., clamped) to pole 113. Collars, clamps, elastic bands, tethered snaps or other coupling devices may be used to hold first and second halves 610, 615 of multi-part deflector 600 together (e.g., for storage or around pole 113 for use). For example, a buckle strap may be cinched around first and second halves 610, 615 to press them together. In an example (e.g., as shown in FIG. 6), clamps may comprise first and second pinch clamps 620, 625 that fit around upper and lower pipe adapters 630, 635. Moving a collar, clamp or other mount may operate to move (e.g., position, reposition), deploy, retract, resize and/ or reshape multi-part deflector 600. For example, a user may pinch first and second pinch clamps 620, 625 to slide them up and down with or without also moving first and second halves 610, 615 to attach, remove or reposition multi-part deflector 600 to, from or on pole 113. In an (e.g., another) example, clamps (e.g., one or more fixed or removable buckle clamps) may be fixed to or removable from first and second pole adapters 630, 635 or other portions of first and second halves 610, 615 (e.g., at or above base and exhaust port).

Second deflector 142 may be utilized with or without a supporting device, such as vacuum 144. Vacuum 144 may comprise a coupler (e.g., a fitting), such as vacuum tube 138, that may be coupled to and decoupled from second deflector 142 to induce airflow (create a draft) from access pipe 149 through second deflector 142. In an example, a user may control first or second pressure tanks 129, 130 (e.g., by turning first or second pressure controls 127, 128) to eject pressurized gas or liquid through one or more ports of ejector 166 to displace obstructions 164 while vacuum 144 assists with debris extraction by sucking air (and rising debris 148 stirred up by ejector 166) out of access pipe 149 and through second deflector 142. Second deflector 142 may comprise a base (e.g., base 143), for example, to rest on surface 146. In an example, base 143 may be weighted, deformable and/or may comprise a gasket (e.g., to seal against surface 146). In an example, base 143 may be flexible, for example, to maintain a seal or approximate seal to surface 146 when it may be uneven. In an example, base 143 may comprise a wide flange that may support a weight, such as a sandbag. Second deflector 142 may comprise a top and bottom gasket to seal to pole 113.

Second deflector 142 may serve multiple purposes. Second deflector 142 may support the weight of underground tool 100. In an example, second deflector 142 may operate as a stand, for example, to relieve a user from supporting the weight of underground tool 100 (e.g., while viewing conditions, ejecting obstructions, deflecting and/or collecting debris, retrieving obstructions). Second deflector 142 may, for example, rest on surface 146 with or without being attached to pole 113. Pole 113 may be moved up and down with second deflector 142 in place (e.g., with or without a gasket to minimize airflow through a gap between pole 113 and the top of second deflector 142). Second deflector 142 may comprise a spring-loaded, pivoting support for underground tool 100, for example, to allow a user to press down (e.g., pulling a first set of springs), pull up on (e.g., pulling another set of springs) or move (e.g., rotate and/or angle) handle 106 and pole 113 (e.g., while base 143 remains in contact with surface 146). In some examples, first and second pole adapters 630, 635 may be enlarged flexible rubber boots with springs therein to allow pole 113 to move up, down and/or side to side (e.g., within multipart deflector 600). Spring-loading and pivoting may permit a user to manipulate underground tool 100 with less stress and fatigue while performing various operations, such as, for example, mating actuator 162 to valve stem 170, moving actuator around to view the access box 168 and/or obstructions 164, selecting a different angle before ejecting pressurized gas or liquid through ejector 166, aiming pole tip towards an obstruction or debris to pick up (e.g., via magnet, grab or stab) and so on. In an (e.g., additional or alternative) example, an additional accessory base for underground tool 100 may comprise, for example, a pivoting, spring-loaded base (e.g., a tripod), configured to rest on surface 146.

A camera may be implemented in and/or on underground tool 100 to support a variety of operations, such as viewing the state of access pipe 149, access box 168, access equipment (e.g., pipe 174, valve 127, valve stem 170), viewing obstructions 164, clearing obstructions 164, maneuvering underground tool 100, steering actuator 162, attaching to and operating underground equipment, etc. A camera may be implemented with or without lighting. A camera may be powered by any energy source (e.g., battery, generator, inverter coupled to vehicle power plug, transformer coupled to AC outlet). A camera may comprise a CCD, CMOS, NMOS or other camera sensor that sense one or more light wavelengths with or without LED lights that emit one or more light wavelengths (e.g., visible, IR). A camera may communicate (e.g., still or video images, control) wirelessly and/or by wire, e.g., to a computer for processing and/or display. A camera may be mounted, for example, on or in pole 113 and/or on or in actuator 162. In an example, lighted camera 158 may be mounted outside actuator 162. Lighted camera cable 120 may connect lighted camera 158 to display 104. Lighted camera cable 120 may comprise, for example, a USB cable. Lighted camera cable 120 may run inside and/or outside actuator 162, pole 113 and handle 106). Display 104 (e.g., user cell phone) may provide power and control signals (e.g., for lights and camera) to lighted camera 158 and receive still and/or video images from lighted camera 158 via lighted camera cable 120. Camera and light control software may be stored on and executed by display 104. In an example, lighted camera 158 may comprise, for example, an endoscope/borescope with software operable on an Android operating system (e.g., a known camera such as a Pancellent® USB endoscope/borescope with a software application for a smart phone or other computer operating system). A built-in controller may permit a user using display 104 (e.g., a smart phone with a touch screen display) to control light brightness, record video, take photos, etc. A camera and/or lighting may be controlled by a user, for example, using a camera application GUI for the camera executed by the computer and/or a UTP GUI with camera and/or lighting controls.

Example underground tool 100 is shown deployed in an access pipe 149 and access box 168 with an underground component (e.g., valve nut 169) obstructed by obstruction(s) 164. Obstruction(s) 164 may comprise any type of debris, such as one or more pieces of metallic and/or non-metallic debris (e.g., dirt, rocks, foliage, paper, pipe, broken lid or pipe), liquid (e.g., water), etc. A person operating underground tool 100 may observe obstruction(s) 164, for example, by attaching a cellular phone, tablet or other computing device with a display to underground tool 100. In an example, a cell phone may be inserted into computer or display holder 102 and attached to lighted camera cable 120. The cell phone may provide power to lighted camera 158 through lighted camera cable 120. A person (e.g., user, operator) may open a software application on the phone to view and/or control lighted camera 158. Lighted camera 158 may shine any type of light (e.g., visible, infrared) and may provide imagery for display by cell phone display 104. A user may, for example, observe obstruction(s) 164 or unobstructed underground component (e.g., valve nut) 169.

Example underground tool 100 shows an example use involving a release of pressurized gas 167 through ejector 166. Pressure 167 may be released, for example, by turning first pressure control 127 and/or second pressure control 128, or by using a UTP GUI control that causes the computer to signal a servo or valve for one or more (e.g., timed) ejections. Pressure may be released from first and/or second tanks 129, 130 through pole 113 and/or through pressure conduit inside and/or outside pole 113 before being ejected through ejector 166 into access box 168 and/or access pipe 149. Arrows above obstruction 164 illustrate pressurized gas 167 forcing part or all of obstruction(s) 164 upward from access box 168 into access pipe 149. Example 100 shows rising debris 148 traveling upward in access pipe 149 before becoming ejected debris 136 upon exiting access pipe 149. Ejected debris 136 may be deflected (e.g., away from the upper body of one or more persons in the vicinity) by a deflector (e.g., first deflector 132, second deflector 142 and/or any other type of deflector). Vacuum 144 may assist with extraction of rising debris 148, for example, by providing suction through second deflector 142. A portion (e.g., tube or lip) of vacuum 144 may be configured to fit inside and/or outside a portion (e.g., tube or lip) of second deflector 142. Some rising debris may not become ejected debris 136 and may, instead, fall. Falling debris 152 may be captured or collected172 (e.g., by one or more debris collectors, such as collector 156), for example, before continuing to fall where it could re-obstruct valve nut 169, valve stem 170 or valve. Collector 156 is shown as undeployed collector 156 and deployed collector 156B. Collector 156 may remain undeployed, for example, until after pressurized gas 167 is emitted to permit debris to rise above collector 156. Collector 156 may deploy 156B (e.g., automatically) in response to pressure and/or a timer following pressurized ejection (e.g., selected using a UTP GUI) or may be deployed manually (e.g., by a person interacting with a collector control on handle 106 and/or pole 113. Collected debris may be extracted, for example, by removing pole 113 from access pipe 149 and dumping out collector 156. Example underground tool 100 may operate valve nut 169, for example, after clearing obstruction(s) 164.

Callout 100A (e.g., as discussed above) shows an example of operation for viewing an ejecting obstructions. FIG. 1 shows other examples of operation, such as retrieving obstructions by gripping or piercing an obstruction in callout 100B, retrieving an obstruction by magnetization in callout 100C, and steering, docking and operating in callout 100D. Additional examples of configurations and accessories that may be associated with downhole operations are shown in callouts 100B, 100C, 100D, FIGS. 2-4 and FIGS. 7A-D.

Callout 100B shows an example of underground tool 100 configured to retrieve an obstruction, such as obstruction 165 that may be too large and/or too heavy to eject and deflect or to displace and capture (e.g., in deployed collector 156B). Obstruction 165 may be metallic or non-metallic. An underground tool (e.g., underground tool 100) may be equipped with a (e.g., retractable) retriever that may, for example, grab, pierce/stab or scoop an obstruction, which may be removed from access pipe 149 by removing the underground tool. A retriever may be mechanical or electromechanical. A retriever control may comprise, for example, first control 108 or second control 110. A mechanical retriever control (e.g., joystick, squeeze handle) may be coupled by a mechanical connector or linkage (e.g., cable(s), rod(s), wire(s)) inside and/or outside pole 113 to a retriever (e.g., pincers, jaws, gripper, sharpened and/or serrated/barbed prong(s) deployable at or near the tip of pole 113 and/or actuator 162. A UTP GUI may provide automated control for operation of one or more retrievers (e.g., operated by a piston or servo signaled by the computer). A retriever may comprise any material and any configuration to retrieve debris. Retriever connector(s) may, for example, be inside sheath 154. A controller (e.g., first control 108) may control, for example, extension and retraction of one or more claws or prongs (e.g., spring steel) by (e.g., maul or automated) twisting, untwisting, pulling and/or pushing (e.g., increasing and/or decreasing tension in or displacing or moving) one or more retriever connectors that transfer energy to a retriever. In an example, multiple pre-bent (e.g., spring steel) prongs may be mounted to one or more spring-loaded hinges. Prongs may be pushed out, for example, by pressing on control 108 and may be retracted by releasing or pulling back on control 108. In an example, a spring-loaded hinge may open up when pressed outside a confined area, causing prongs to spread open. In an example, pre-bent or pre-stressed spring steel prongs with or without a spring-loaded hinge may spread open when pressed outside a confined space. Prongs 176 may (e.g., when extended then retracted) grab and hold onto an object, e.g., obstruction 165, for example, when retriever control 108 is released or pulled back, causing prongs to draw back together. One or more prongs 176 may (e.g., alternatively) be sharpened or pointed to pierce or stab debris. In an example, a connector may comprise a throttle cable coupled to a retriever (e.g., pincers, jaws, gripper, sharpened and/or serrated/barbed prong(s)) operated (e.g., by a retriever control) to grab, or pierce/stab one or more obstructions (e.g., paper, leaves, plastic debris).

Callout 100C shows an example of underground tool 100 configured to retrieve an obstruction, such as obstruction 165 that may be too large and/or too heavy to eject and deflect or to displace and capture (e.g., in deployed collector 156B). Obstruction 165 may comprise a metallic material attracted to magnets. Access pipes and lids may be constructed from iron, for example. Pieces of damaged pipe and/or lids may fall into access pipe 168 and may obstruct access to underground component 169. In an example, underground tool 100 may be equipped or configured with magnetized retriever 178 that may, for example, attract and hold magnetic obstruction 165. In an example, one or more magnets may be embedded in or mounted to actuator 162 and/or one or more portions (e.g., tips) of actuator 162 may be magnetized (e.g., as shown by example in FIGS. 7A-D). Magnets may comprise, for example, fixed (e.g., always on) or permanent magnets, electrically switched magnets such as electromagnets, mechanically switched magnets (e.g., Magswitch®) and so on. Switchable magnets may be coupled to a user control (e.g., first control 108, second control 110) via electrical and/or mechanical connector(s) to convey control to switchable magnets. IN some examples, a user may use a UTP GUI to operate a magnet retriever. Obstruction 165 may be removed from access box 168 and access pipe 149 by withdrawing underground tool 100 while magnetized retriever 178 holds obstruction 165.

Callout 100D shows an example detail of underground tool 100 configured with a steerable pole section and/or steerable actuator. Access pipe 149 and/or access box 168 may be misplaced and/or may shift or even break, for example, due to improper packing, loading, freeze/thaw cycles or other ground shifting. Deformed (e.g., broken, shifted) access pipe 149B and/or deformed access box 168B may prevent access to and/or control of underground component 169 with a straight, inflexible pole and actuator. In an example, actuator 162 may be coupled (e.g., directly or indirectly) to flexible pole section 155B, which may configure actuator 162 to be steerable in one or more directions. Steering may be manual and/or automated. In an example, one or more steering connectors (e.g., rods, wires, cables, spring steel) may be coupled between actuator 169 and/or to flexible pipe 155B and one or more controls. In an example, one or more (e.g., one, two, three, four) steering connectors may be coupled to steering or other control (e.g., control 110 on mount 116 on handle 106 or pole 113). In some examples, a steerable pole section and/or actuator may (e.g., only) move in one or two directions given that a user may physically move or rotate pole 113. Steering connector(s), such as first or second control cables 112, 124, may, for example, be inside sheath 154. In an example, second control 110 may control a flexible pole section (e.g., flexible pole section 155B) and/or actuator 162, for example, by twisting, untwisting, pulling and/or pushing (e.g., increasing and/or decreasing tension in or displacing or moving) one or more connectors, thereby steering actuator 162. In some examples, a user may use a UTP GUI or a computerized joystick control to control one or more servos or pistons to steer flexible pole section 155B and/or actuator 162. A further example of steerable pole section and/or actuator is shown in FIG. 3.

FIGS. 1-4 show several of many possible configurations of underground tool 100. There may be many different configurations for each component. Component types, shapes, functions, controls, locations, etc. may vary among many different implementations. FIGS. 1-4 show a few examples of many different configurations of user interface (e.g., handle) 106, pole 113 (e.g., as fixed or flexible-steerable segments), actuator 162 (e.g., as fixed or steerable) and accessories (e.g., controls, couplers, tanks, etc.). There are many more implementations beyond examples shown, made evident to one or ordinary skill by examples and discussion herein. A brief discussion is provided for comparison of examples shown in FIGS. 1-4.

As shown in FIG. 1, first example underground tool 100 is shown with handle 106 comprising first and second (e.g., mechanical or electromechanical) controls 108, 110 on first and second mounts 111, 116 and display 104 on display holder/mount 102. First and second control cables 112, 124 and lighted camera cable 120 are shown in conduit, sheath or sleeve 154 in pole 113, for example, exiting pole 113 under first pole coupler 118 at cable termination 122. Pole 113 is shown with first and second tanks 129, 130 coupled to first and second pressure couplers 125, 126.

As shown in FIG. 2, second example underground tool 200 is shown with handle 206 comprising first and second controls 208, 210 mounted to handle 206 with first and second control cables 212, 224 and lighted camera cable 220 remaining inside sheath or sleeve 254 in pole 213 and handle 206 before exiting handle 206, respectively, near first and second controls 208, 210 and display holder 202. Handle 206 is shown with first tank 229 coupled to first pressure coupler 225 coupled to handle 206, indicating handle 206 may form a portion of pressure conduit leading through pole 213 to actuator 262. Pole 213 is shown with rigid segment 255 coupled to actuator 262.

As shown in FIG. 3, third example underground tool 300 is shown with handle 306 comprising first control 308 and display mount/steering control 302 mounted to handle 306 with first control cable 312, steering control cables 323 and lighted camera cable 320 remaining inside pole 313 and handle 306 before exiting handle 306, respectively, near first control 308 and display mount/steering control 302. In this example, display mount and steering control may be integrated together. A user may pull, tilt, twist or otherwise move display mount 302 to move one or more cables and thereby move one or both flexible pole segment 355 and/or actuator 362, e.g., depending how each of multiple steering control cables 323 are terminated. In an example, display mount or holder 302 may comprise, for example, a ball and socket or plate tethered to steering control cables 323 attached to pole 313 and/or actuator 362. A centered display mount 302 may permit a relatively straight, tightened connection without turning cables to controls right or left of center on handle 306. In an (e.g., another) example, display holder 302 may be positioned elsewhere and a dedicated steering control may be mounted in line with pole 313.

Handle 306 is shown with first tank 329 coupled to first pressure coupler 325 coupled to handle 306. Pole 313 is shown with flexible segment 355B coupled to actuator 362. Ejector operation (e.g., and/or operation of retriever, collector, actuator, and so on) may be automated. As shown by example in FIG. 3, a user may control pressure coupler 325 (e.g., a valve in pressure coupler 325) using an underground tool program (UTP) graphical user interface (GUI) displayed by computing device (e.g., cell phone) 304. A UTP GUI may provide a user with pressure burst selections (e.g., in terms of number of bursts, lengths of bursts, and so on). A control signal may be provided from a computer via control wire 301 to a valve (e.g., in pressure coupler 325).

As shown in FIG. 4, fourth example underground tool 400 is shown with display holder 402 mounted to handle 406. Lighted camera cable 420 may be inside sheath or sleeve 454 in pole 413 and handle 406 before exiting handle 406 near display holder 402. Top of pole 413 is shown coupled to first and second angled pipes 431, 435 capped by first and second controls 408, 410. First and second control cables 412, 424 may be inside sheath or sleeve 454 in pole 413 and split, respectively, into first and second angle pipes 431, 435 before connecting to first and second controls 408, 410. First tank 429 may be coupled to first pressure coupler 425, which may be coupled toward top of pole 413.

FIGS. 7A-D show examples of accessories relative to actuators, according to an embodiment. FIGS. 7A-D show four different examples of an actuator end of an underground tool 700A-D. Actuator 705 may comprise, for example, a cylinder having a length and a diameter. Actuator 705 may have other shapes (e.g., square, rectangular, hexagonal and so on). Actuator 705 is shown with a valve key comprising center recess 725 (e.g., to accept valve stem) separating first and second jaws 710, 715 (e.g., configured to fit or mate with a valve stem). First and second jaws 710, 715 and recess 725 may be fixed (e.g., milled from a stainless steel bar or shape or welded) or variable (e.g., a jaw may be varied to widen or narrow the gap between jaws). Variable jaws may be adjusted manually or automatically, e.g., by sliding or incrementally stepping jaw width. First and second jaws 710, 715 (or their integrated or attached tips) may be magnetized, for example, as discussed with respect to other examples, to pick up metallic fragments.

Actuator 705 is shown with three openings (e.g., first, second and third holes 730, 735 and 755) through recessed portion 725. Actuator 705 may have any number of openings of one or more sizes or diameters. Actuator 705 may have a rear recess area 720 on the pole-facing side of actuator 705, which may reduce the depth of first, second and third holes 730, 735 and 755. Holes may provide a pathway from user controls through the interior of a pole to controlled devices coupled to or housed by actuator 705. Holes may be used, for example, to eject pressurized gas or embed, conceal, protect and/or house fixed, removable, retractable, and/or controllable devices (e.g., camera, lighting, or grab, stab, and/or magnetic retriever(s))). Actuator key pattern may vary (e.g., to control various underground equipment) and the location of holes and devices may vary accordingly.

In an example, an (e.g., endoscope/borescope) lighted camera 740 may be inserted in and protected by second hole 735 in actuator 705. Lighted camera 740 may have, for example, LED lights 745 and camera 750, which may be controlled and powered by, for example, a cellular phone, tablet or other portable computing device. A cellular telephone or other computing device may also display images received from lighted camera 750. In an example, lighted camera 740 may be (e.g., slightly) recessed from the surface of center recess 725, for example, to avoid contact with the top of valve stems, debris, etc.

Figure 7A:
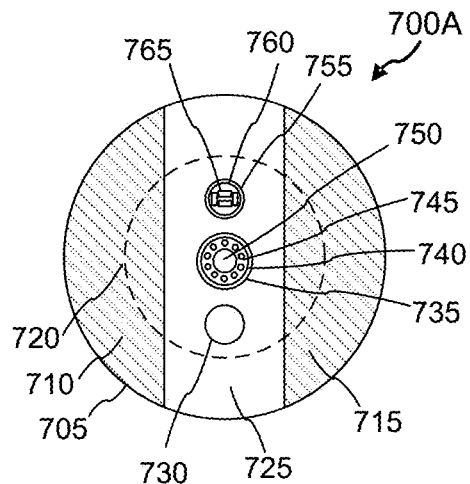
FIGS. 7A-D shows examples of accessories relative to actuators, according to an embodiment.
Figure 7B:
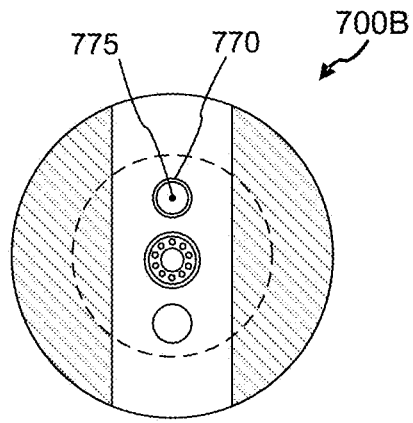
Figure 7C:
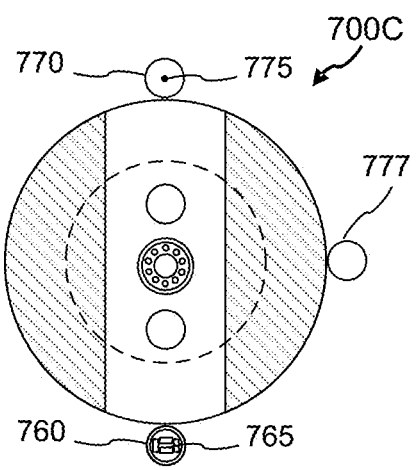
Figure 7D:
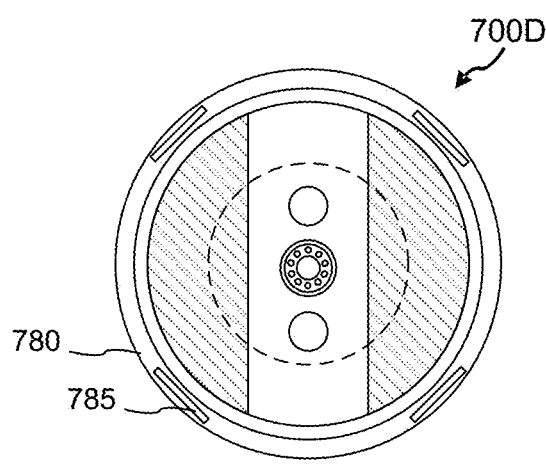

In an example, one or more holes may comprise pressure ports that may be configured (e.g., may be used to) eject pressurized gas released into pole or to a pressure line coupled to holes. As shown in FIGS. 7A and 7B, first hole 730 may eject pressurized gas, which may be transmitted internally through a pole. As shown in FIGS. 7C and 7D, first and third holes 730 and 755 may be used to eject pressurized gas. Holes may or may not be fitted with ejection nozzles.

In an example, one or more holes may be used to house one or more retrievers. For example, as shown in FIG. 7A, third hole 755 may house first retriever 760 with multiple prongs 765. As shown in FIG. 7B, third hole may house second retriever 770 with one prong 775. As shown in FIG. C, first retriever 760 with multiple prongs 765 and second retriever 770 with single prong 775 may be mounted to the exterior of actuator 705. FIG. 7C shows an additional and/or alternative ejector 777 external to actuator. As shown in FIG. 7D, a larger retriever (e.g., third retriever 780 with four prongs 785) may fit around an actuator (e.g., external to actuator) or may be integrated with an actuator (e.g., at the outer perimeter of actuator). In an example, holes through actuator 705 may be used to connect four prongs 785 to linkage internal to a pole to user controls (e.g., as previously shown). Retrievers, cameras, lights, ejectors, etc. may be internal and/or external to actuators and/or poles.

In some examples, actuators (e.g., of varying sizes) may be swapped or replaced for other actuators with holes in the same place to adapt to one or more devices that may be housed within the holes. Various actuators may slip on and lock (e.g., pin lock) onto pole, for example, rather than thread on. In other examples, one or more devices may be mounted (e.g., and sealed) to or in holes in each of multiple actuators with connectors that connect to connectors coupled to control wires and/or cables inside a pole to link up to user controls. Holes may not or may not have the same configuration. Holes and/or devices may be different for each of multiple actuators (e.g., and/or other accessories attached to a pole), which may support allowing users to control different devices with the same user control(s) and wired or wireless control, cable or other linkage.

FIG. 8 shows an example of compact storage of a disassembled underground tool, according to an embodiment. In an example, disassembled (e.g., broken down) underground tool 800 is shown as a disassembled version of example underground tool 100 shown in FIG. 1. Disassembled underground tool 800 is shown, along with additional accessories, in underground tool storage case 805. Underground tool 100 may be disassembled, for example, at first, second, third and fourth pole couplers 118, 140, 150, and/or 160. Underground tool 100 or disassembled underground tool 800 may be foldable or folded together with pole segments and handle for compact storage anywhere, e.g., as opposed to storage only in the bed of a truck due to fixed long length. Sheath or sleeve 154 may retain (e.g., guide or contain) and protect control wires, cables and/or other linkages to controllable devices while a tool is disassembled. First and second deflectors 132, 142 may be removed (e.g., if configured to be removable) from pole 113 for storage. Each may be one or more pieces that separate. One or more clamps (e.g., 620, 625) may be (e.g., configured to be) removed or may remain on pole 113 to hold and release first and/or second deflectors 132, 142. Extra accessories, such as additional pole segments 861A, 861B and actuators 863A, 863B may be stored with disassembled underground tool 800. Storage lid 810 may close over case 805. Case 805 and lid 810 may be latched together by one or more latches 815. Disassembled underground tool 800 and accessories may be stored, protected and transported in case 805 (e.g., with carrying handle 820) and/or other compact forms.

Figure 9:
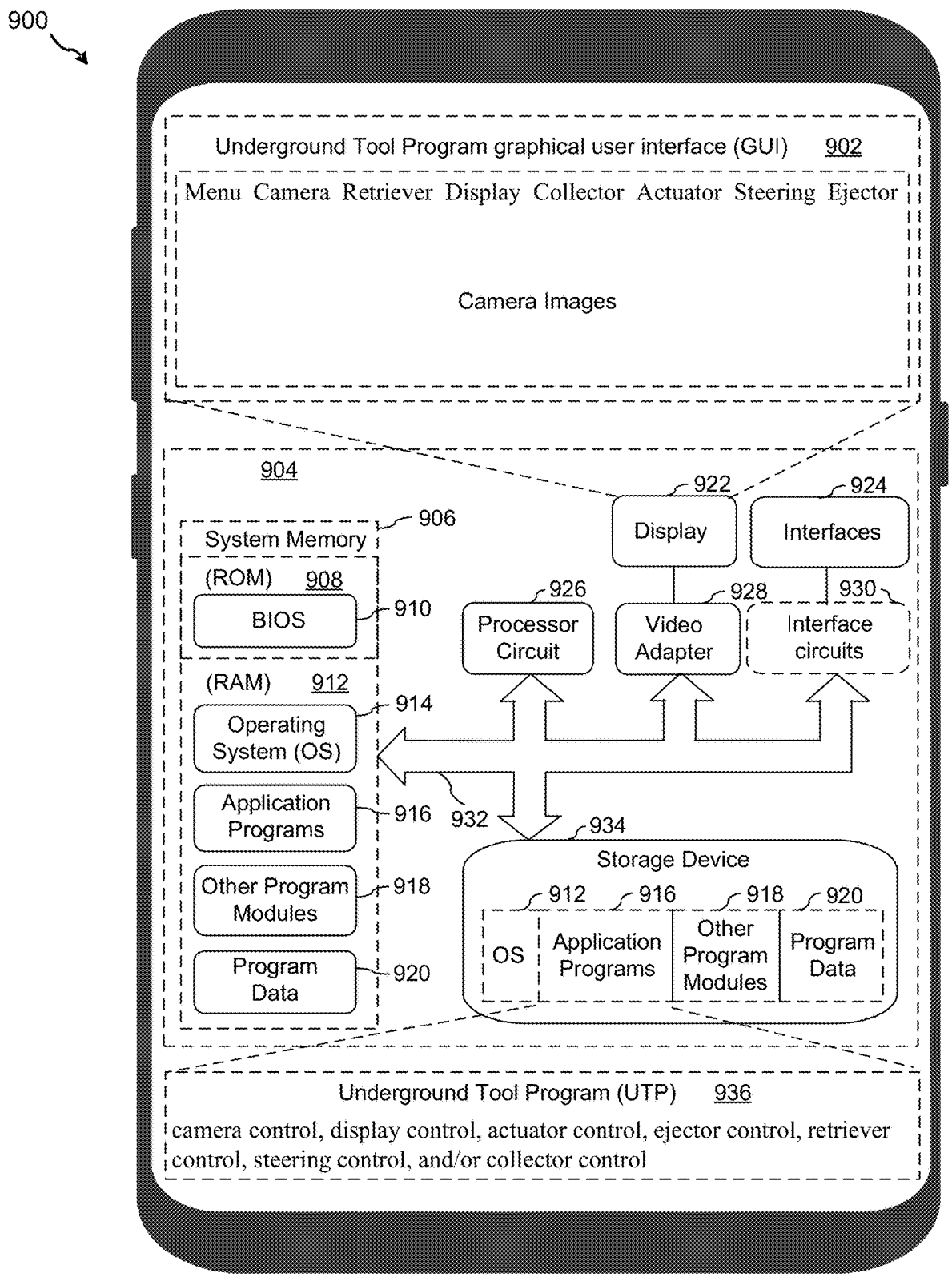
FIG. 9 shows a block diagram of an example computing device that may be used to implement example embodiments.

FIG. 9 shows an exemplary implementation of a computing device 900 in which example embodiments may be implemented. Computing device 900 may be, for example, a cellular telephone, a personal digital assistant (PDA), a smartphone, a laptop, a netbook, a personal computer, an Internet of Things (IoT) device, a watch or other wearable device, a head-mounted display (HMD) such as goggles or glasses, etc. Computing device 900 is a non-limiting example for purposes of illustration. Example embodiments may be implemented in other types of computer systems. Control (e.g., processes) described above may be implemented in a computer program, software, and/or firmware incorporated in a computer-readable medium for execution by a computer and/or processor.

Computing device 900 may comprise, for example, an implementation of camera control, video control, actuator control, ejector control, retriever control, steering control, collector control, etc., as described with reference to FIGS. 1-8. Examples of computer-readable media include, but are not limited to, electronic signals (transmitted over wired and/or wireless connections) and/or computer-readable storage media. Examples of computer-readable storage media include, but are not limited to, read only memory (ROM), random access memory (RAM), a register, cache memory, semiconductor memory devices, magnetic media such as, but not limited to, solid state drives (SSDs), hard disk drives (HDDs) and removable drives or disks, magneto-optical media, and/or optical media such as compact disc (CD)-ROM disks, and/or digital versatile disks (DVDs).

As shown in FIG. 9, computing device 900 may include computing system 904. Computing system 904 may include one or more processors (e.g., processor circuit 926), system memory 906, and a bus 932 that couples various system components, e.g., including system memory 906 to processor circuit 926. Processor circuit 926 may be an electrical and/or optical circuit implemented in one or more physical hardware electrical circuit device elements and/or integrated circuit devices (e.g., semiconductor material chips or dies), such as a central processing unit (CPU), a microcontroller, a microprocessor, and/or other physical hardware processor circuit. Processor circuit 926 may execute program code stored in a computer readable medium, such as program code of operating system 936, application programs 938, other programs 940, etc. Bus 932 may include one or more of any of several types of bus structures, e.g., including a memory bus or memory controller, a peripheral bus, an accelerated graphics port, and/or a processor or local bus using any of a variety of bus architectures. System memory 906 may include read only memory (ROM) 908 and random-access memory (RAM) 912. A basic input/output system 910 (BIOS) may be stored in ROM 908.

Computing system 904 may have one or more storage devices (e.g., a (removable) flash memory device, an SSD, an HDD for reading from and writing to a hard disk, a magnetic disk drive for reading from or writing to a removable magnetic disk, an optical disk drive for reading from or writing to a removable optical disk such as a CD ROM, DVD ROM, or other optical media). One or more storage devices may be connected to bus 932 by a respective interface. A storage device (e.g., and associated computer-readable media) may provide nonvolatile storage of computer-readable instructions, data structures, program modules and/or other data for computing system 904. Other types of hardware-based computer-readable storage media can be used to store data, such as flash memory cards, digital video disks, RAMs, ROMs, etc.

One or more program modules may be stored on computer-readable storage media. Programs may include operating system 914, one or more application programs 916, other programs 918, and/or program data 920. Application programs 916 or other programs 918 may include, for example, computer program logic (e.g., computer program code or instructions) for implementing control of any of the components shown in FIGS. 1-8. An application program may be underground tool program (UTP) 936. UTP 936 may include, for example, one or more of the following: a camera control that may (e.g., be used to) control one or more automated features of a camera, a video control that may (e.g., be used to) control one or more automated features of video, actuator control that may (e.g., be used to) control one or more automated features of an actuator (e.g., actuator servo that turns an actuator key), ejector control that may (e.g., be used to) control one or more features of ejector operation (e.g., ejector valve that opens and closes a valve to emit pressurize gas or liquid), retriever control that may (e.g., be used to) control one or more automated features of a retriever (e.g., retriever piston that projects and withdraws a retriever), steering control that may (e.g., be used to) control one or more automated features of steering (e.g., steering servo that rotates linkages to change a direction and/or angle of a portion of a pole and/or actuator), collector control that may (e.g., be used to) control one or more automated features of a collector (e.g., collector piston that opens and closes a collector).

Computing system 904 may include and/or may be coupled (e.g., via bus 932 and/or interfaces 924) to one or more (e.g., peripheral) devices (not shown), such as a touch screen or touch pad, display 922 (e.g., displaying a virtual keyboard and pointer for the touch pad or touch screen), microphone, joystick, game pad, a voice recognition system to receive voice input, a gesture recognition system to receive gesture input, or the like, speakers, microphone, software and/or hardware modules that provide wired or wireless connectivity, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, an HMD (e.g., video glasses, virtual reality and/or Augmented Reality (VR/AR) device), an activity tracker, one or more sensors (e.g., gyroscope, accelerometer, hall effect sensor, magnetometer, orientation sensor, proximity sensor, temperature sensor, time sensor; geolocation sensor; altimeter, light sensor, touch sensor, magnetometer, barometer, gesture sensor, biometric sensor, humidity sensor).

A user may enter commands and information into computing system 904 through one or more input devices (e.g., a touch screen or touch pad keyboard and/or pointer). One or more communication (e.g., input and/or output) devices may be connected to processor circuit 926 through one or more interfaces 924 coupled to bus 932 (e.g., through one or more interface circuits 930). For example, a touchscreen that a user may interact with based on images displayed by display 922 may be an interface and a touchscreen circuit may be a communication circuit that interfaces the touchscreen to bus 932 (e.g., and UTP 936 execute by processor circuit 926. For example, an antenna that receives and transmits wireless signals may be an interface and a transceiver may be a communication circuit that interfaces the antenna to bus 932. Interfaces may include, for example, a connector or port, such as a USB port (e.g., USB-A, USB-C), through which a user may connect compatible devices.

Display (e.g., visual screen) 922 may be connected to bus 932 via an interface, such as a video adapter 928. Display 922 may be external to, or incorporated in computing device 900. Display 922 may display information. Display 922 may be integrated with a user interface for receiving user commands and/or other information (e.g., a touch screen or touch pad interface detecting input by touch, finger gestures, virtual keyboard). Computing device 900, computing system 904 and/or display 932 may be an HMD. As shown in FIG. 9, display 922 may display UTP GUI 902 generated based on execution of UTP 936 by processor circuit 926. UTP GUI 902 may include, for example, a user interface for steering control (e.g., configured for the user to steer at least a portion of the pole or the actuator); actuator control (e.g., configured for the user to control the actuator); deflector control (e.g., configured for the user to control a deflector); a retriever control (e.g., configured for the user to control at least one retriever); ejector control (e.g., configured for the user to control the ejector); camera control (e.g., configured for the user to control the camera); and/or display control (e.g., configured for the user to control a display of the images). UTP GUI 902 may use or may be integrated with an imaging program. In some examples, display 922 may display images (e.g., based on camera sensor data) using an imaging program (e.g., an application or app) provided with the camera.

Computing system 904 may connect to (e.g., and communicate with) a network (e.g., the Internet) through one or more interfaces (e.g., interfaces 924, such as a network interface). A network may include a wireless network (e.g., a mobile network, such as a cellular network).

Computer programs and modules (including application programs 932 and other programs 934) may be stored on one or more computer readable storage devices and/or media. In some examples, computer programs, when executed or loaded by an application, may (e.g., be configured and/or used to) enable computing system 904 to implement (e.g., in part) one or more features (e.g., controls) of example embodiments described herein. Example embodiments are directed to computer program products comprising computer-executable code or instructions stored on any computer-readable medium (e.g., storage device).

Systems, methods, and instrumentalities are disclosed for an underground tool that may be (e.g., in various implementations) compact, universal, multi-purpose and/or reconfigurable. A variety of underground components in a variety of conditions may be remotely viewed, cleared of obstructions and controlled with one tool that may be broken down and stored in a compact case. A portable computer (e.g., an operator's cell phone), which may be attached to or held by the tool, may (e.g., be used to) power a lighted camera recessed in an actuator (e.g., valve key) to observe underground conditions and assist with operations (e.g., clear obstructions, maneuver, steer, attach to and operate underground equipment). Accessories may be adjusted, added or removed to accomplish a variety of tasks in a variety of conditions. Integrated, detachable, fixed or adjustable accessories may include, for example, a display holder, ejector, retriever, magnet, debris deflector, debris collector, pressure tank, pressure hose, actuators and other pole tips, pole sections, handles and accessory controls. Additional examples are provided.

In an example, an apparatus may be or may include an underground tool (e.g., a portable, hand-held underground tool). An underground tool may include, for example, an actuator, a user interface, a pole, a camera and/or an ejector. An actuator may be, for example, a coupler, a valve key, a socket, a plug (e.g., a nut), a bit, etc. Actuator operation may be manual, automatic, mechanical, electromechanical, hydraulic, pneumatic, electric, etc. An actuator may be configured or configurable to fit an underground component (e.g., a valve nut) configured as an interface for underground equipment (e.g., valve). An actuator may be used to control or operate (e.g., rotate, open, close, switch, activate, deactivate, engage, disengage) an underground component. An underground component may be or may provide an operational interface for a device. For example, operation of an underground component may open or close a valve. A user interface (e.g., a handle) may be configured or configurable for a user to control the apparatus. For example, a handle may be detachable from a pole, foldable, etc., such that it may be configured to operate one or more features of the apparatus. A pole may be coupled or configured to be coupled between the user interface and the actuator. A camera may be attached to the pole or actuator, recessed or configured to be recessed in the actuator, etc. For example, an actuator may have one or more openings (e.g., holes) for a camera, retriever, etc. retained by the pole to fit or slide into, allowing actuators to be removed and replaced. A camera may be configured to communicate images of underground conditions to a display viewed by the user. A user may use display images, for example, to observe underground conditions, move obstructions obstructing an underground component, position the actuator on the underground component, etc. An ejector may be configured to emit pressurized gas or liquid through a port to dislodge (e.g., clean, eject, move) debris obstructing an underground component.

In some examples (e.g., example implementations), the pole may be a pipe. An interior of the pole (e.g., pipe) may be configured to convey the pressurized gas or liquid to the ejector (e.g., or to the actuator) through an interior of the pipe. In some examples, a pipe (e.g., a flexible pipe) may be attached to the pole to convey the pressurized gas or liquid to the ejector (e.g., coupled to the pole and/or actuator). In some examples, an interior of the actuator may be configured to convey the pressurized gas or liquid to the port. In some examples, an interior of the user interface (e.g., handle) may be configured to convey the pressurized gas or liquid (e.g., to the pipe).

In some examples, the pole (e.g., pipe) may include multiple segments, such as a first segment with a first connector and a second segment with a second connector configured to couple to and decouple from the first connector to assemble and disassemble the first and second segments of the pole. In some examples, the user interface (e.g., handle) and/or the actuator may have one or more connectors configured so that the user interface and/or actuator may be assembled to and disassembled from the pole. Disassembly may support compact storage, portability, protection, etc. for underground tools (e.g., in a fixed or portable container or case).

In some examples, the user interface may include at least one of the following: a steering control (e.g., configured for the user to steer at least a portion of the pole or the actuator); an actuator control (e.g., configured for the user to control the actuator); a deflector control (e.g., configured for the user to control a deflector); a retriever control (e.g., configured for the user to control at least one retriever); an ejector control (e.g., configured for the user to control the ejector); a camera control (e.g., configured for the user to control the camera); and/or a display control (e.g., configured for the user to control a display of the images).

In some examples, the apparatus may include at least one of the following: a retriever (e.g., configured to), a deflector, and/or a collector (e.g., configured to collect debris ejected by the ejector). One or more retrievers, one or more deflectors, and/or one or more collectors may be coupled or configured to be coupled to the pole and/or actuator. Examples may include one or more types of retriever (e.g., grip, stab, scoop, magnet). A retriever may be configured and/or used (e.g., deployed or deployable) to retrieve debris obstructing the underground component. A deflector may be configured and/or used (e.g., deployed or deployable) to deflect debris away from the user (e.g., debris ejected above ground by the ejector). A collector may be configured and/or used (e.g., deployed or deployable) to collect debris ejected by the ejector (e.g., to prevent the ejected debris from re-obstructing the underground component).

In an (e.g., another) example, an apparatus may be or may include an underground tool (e.g., a portable, hand-held underground tool). An underground tool may include, for example, a pole, a camera, an ejector and/or a retriever. A pole may be coupled or configured to be coupled between the user interface and the actuator. A camera may be attached to the pole or actuator, recessed or configured to be recessed in the actuator, etc. A camera may be configured to communicate images of underground conditions to a display viewed by the user. A user may use display images, for example, to observe underground conditions, move obstructions obstructing an underground component, position the actuator on the underground component, etc. An ejector may be configured to emit pressurized gas or liquid through a port to dislodge (e.g., clean, eject, move) debris obstructing an underground component. A retriever may be configured and/or used (e.g., deployed or deployable) to retrieve debris obstructing the underground component.

In some examples, the apparatus may comprise the actuator. The actuator may include, for example, the camera and/or the ejector. The camera may be recessed or configured to be recessed in the actuator. In some examples, a camera may be secured to the pole. One or more (e.g., removable) actuators may be configured (e.g., with a hole) to fit (e.g., slip over or adjacent to) the camera (e.g., and attach to the pole). In some examples, a camera may be coupled (e.g., epoxied) to an actuator. One or more camera connectors may be attached and/or detached to one or more camera connectors coupled to a cable in or on the outside of the pole. The ejector may be implemented, for example, as one or more openings (e.g., orifices, holes or ports) in the actuator to convey and/or emit pressurized gas and/or liquid (e.g., received through the pole in the form of a pipe). In some examples, one or more ejectors and/or one or more cameras may be implemented adjacent and/or attached to the pole and/or actuator.

An actuator may (e.g., be used to) control or operate (e.g., rotate, open, close, switch, activate, deactivate, engage, disengage) an underground component. For example, operation of an underground component may open or close a valve. An actuator may be or may include, for example, a key or fitting (e.g., mechanical or electrical component) that fits or mates to a corresponding fitting (e.g., valve nut) for underground equipment (e.g., a valve). An underground component may be or may provide an operational interface for underground equipment. An actuator key may be or may include, for example, a coupler, a socket, a plug (e.g., a nut), a bit, etc. An actuator or a portion thereof may be configured or configurable (e.g., adjustable, deployable) to fit an operational interface of an underground component (e.g., a valve nut). For example, an actuator key may be a valve key (e.g., a valve socket) that, when mated to a corresponding fitting (e.g., an operational interface) of a valve (e.g., a valve nut) and moved/operated to move the corresponding valve fitting (e.g., valve nut), opens or closes the valve. Actuator operation may be manual, automatic, mechanical, electromechanical, hydraulic, pneumatic, electric, etc.

In some examples, the apparatus may comprise the user interface. A user interface (e.g., a handle) may be configured or configurable for a user to control the apparatus. A user interface may be configured to operate one or more features of the apparatus (e.g., camera, display, power, hydraulic or pneumatic pressure ejection, debris deflection, debris collection, downhole debris or item retrieval such as grip, stab, grab, magnetic pick-up). A user interface may be, for example, a handle and/or an attachment point for one or more other user interfaces. Interfaces may include, for example, mechanical controls, electromechanical controls, hydraulic controls, pneumatic controls, displays, touchscreen controls, camera controls, a display holder (e.g., cell phone holder), display controls, power controls, etc. In some examples, a user interface (e.g., handle) may be detachable from a pole, foldable, etc., for example, for compact storage and/or protection of sensitive items (e.g., connectors, cell phone holder, controls).

In some examples (e.g., example implementations), the pole may be a pipe. An interior of the pole (e.g., pipe) may be configured to convey the pressurized gas or liquid to the ejector (e.g., or to the actuator) and ejected through one or more ports by passing through an interior of the pipe. In some examples, a pipe (e.g., a flexible pipe) may be attached to the pole to convey the pressurized gas or liquid to the ejector (e.g., coupled to the pole and/or actuator). In some examples, an interior of the actuator may be configured to convey the pressurized gas or liquid to the port. In some examples, an interior of the user interface (e.g., handle) may be configured to convey the pressurized gas or liquid (e.g., to the pipe).

In some examples, the pole (e.g., pipe) may include multiple segments, such as a first segment with a first connector and a second segment with a second connector configured to couple to and decouple from the first connector to assemble and disassemble the first and second segments of the pole. In some examples, the user interface (e.g., handle) and/or the actuator may have one or more connectors configured so that the user interface and/or actuator may be assembled to and disassembled from the pole. Disassembly may support compact storage, portability, protection, etc. for underground tools (e.g., in a fixed or portable container or case).

In some examples, the user interface (e.g., handle) may comprise a pipe. An interior of the user interface (e.g., pipe) may be configured to convey the pressurized gas or liquid to the pole (e.g., pipe) from a source (e.g., a portable pressurized tank, a tank and pump). In some examples, a pipe (e.g., a flexible pipe) may be attached to the handle to convey the pressurized gas or liquid to the pole or a pipe along the pole.

In some examples, the user interface (e.g., pipe) and/or pole (e.g., pipe) may include multiple segments, such as a first segment with a first connector and a second segment with a second connector configured to couple to and decouple from the first connector to assemble and disassemble the first and second segments of the user interface and/or the user interface and the pole or one or more segments of the pole with one or more connectors. Connectors supporting assembly and disassembly may support compact storage, portability, protection, etc. for the user interface and/or the underground tool (e.g., in a fixed or portable container or case).

In some examples, connectors may be pressure couplers. A user interface, pole, and/or actuator may include a pressure coupler to couple one or more pressure sources to one or more ports outside (e.g., external to) and/or inside (e.g., through) the user interface, pole, and/or actuator (e.g., via a conduit internal or external to the user interface, pole, and/or actuator). In some examples, the user interface and/or the pole may be configured (e.g., may include) a pressure coupler configured to couple to and to (e.g., rigidly) hold or suspend a portable pressure tank and/or a pressure hose. A connector (e.g., pressure coupler) may comprise, for example, a pneumatic or a hydraulic quick coupler.

In some examples, segments (e.g., of a user interface, pole, and/or actuator) may be tethered together. A tether may be a flexible conduit (e.g., a Nylon sheath) through which one or more wires, cables, etc. may pass between user interface, pole, and/or actuator. In some examples, the interior of a user interface, pole, and/or actuator or a conduit in the pipe, such as a (e.g., flexible) tether may include one or more power cables, communication cables and/or control cables (e.g., a camera communication cable, an actuator communication cable, a camera power cable, an actuator power cable, a retriever control cable, an actuator control cable, and/or a steering control cable).

In some examples, an apparatus (e.g., underground tool) may include one or more deflectors. A deflector may be coupled or configured to be coupled to the pole. A deflector may be configured or configurable (e.g., deployable, retractable, attachable, detachable) to deflect debris ejected above ground by the ejector. A deflector may deflect debris away from a user. For example, a deflector may be fixed (e.g., deployed) or deployable (e.g., retractable). A deflector may be assembled and disassembled on and/or around a pole. A deflector may be clamped to a pole. A deflector may be angled, for example, to alter the direction of travel of debris away from a user. A deflector may configured to cover (e.g., seal) an opening in the ground around the pole and redirect ejected obstruction debris. A deflector may be configured to confine debris, for example in a (e.g., an angled) pipe or conduit. Suction (e.g., by a vacuum) may be coupled to a deflector to support or assist debris extraction through a confined space (e.g., a debris conduit), for example, to prevent the ejected obstruction debris from re-obstructing the underground component. A deflector may additionally and/or alternatively be deployed while the pole is in the access pipe to deflect items away from the access pipe.

In some examples, an apparatus (e.g., underground tool) may include one or more collectors. A collector may be coupled or configured to be coupled to the pole and/or actuator. A collector may be configured or configurable (e.g., deployable, retractable, attachable, detachable) to collect, capture or trap debris ejected by the ejector. A (e.g., deployed) collector may be shaped like a cone, cup, upside down umbrella, and/or other debris-collecting shape. A collector may be rigid and/or flexible deployed and/or retracted. One or more collectors may be mounted on or near the actuator. A collector may be positioned underground (e.g., on a portion of the pole in an access pipe) to collect debris before it falls to the bottom of the access pipe, potentially re-obstructing the underground component. One or more collectors may be deployed (e.g., manually or automatically), for example, after triggering a pressurized ejection to force debris upward. A collector may be configured to deploy and press against underground walls (e.g., access pipe wall). Following collection of debris, a collector may be retracted and/or removed. A retracted (e.g., closed) collector may be reduced in size and/or shape compared to deployed size and/or shape, for example, to support insertion and/or removal from an access pipe. A collector may additionally and/or alternatively be deployed while the pole is in the access pipe to capture anything that may fall down the access pipe. A user may manually operate (e.g., deploy, retract) a collector, for example, by pushing and pulling a collector control to open and close a collector, e.g., after operation of the ejector to capture falling obstruction debris.

In some examples, an apparatus (e.g., underground tool) may include one or more retrievers. A retriever may be coupled or configured to be coupled to the pole and/or actuator. A retriever may be configured or configurable (e.g., deployable, retractable, attachable, detachable) to retrieve debris (e.g., obstructions) and/or other items in an underground access pipe or equipment box. A retriever may be any type (e.g., grab or grip, stab or penetrate, scoop, magnetic pickup). For example, at least a portion of an actuator may be magnetized and/or may include at least one magnet to pick up debris. In some examples, one or more retrievers may be mounted to an exterior of the pole and/or actuator. A retriever may be (e.g., configured to be) coupled to and decoupled from at least one of the pipe and the actuator. In some examples, one or more retrievers may be mounted inside the pole and/or actuator. For example, a retriever may be controlled (e.g., by a user using a retriever control) to extend from and retract into at least one of the pipe and the actuator. Debris may, for example, be held by clenched jaws of a grab or grip retriever, pierced and held by a barbed stab retriever, held by a scoop or held by a magnet.

In some examples, an apparatus (e.g., underground tool) may include a portable computer mount. A computer mount may be coupled or configured to be coupled (e.g., fixedly or removably attached, such as by one or more retainers or clamps) to the user interface and/or the pole. A computer mount may hold a portable computer (e.g., cell phone, tablet) for interaction and/or viewing by a user. A computer (e.g., as shown by example in FIG. 9) may provide (e.g., perform) a user interface and/or perform functions, such as one or more of the following: supply power to the camera, process image data from the camera, and/or display the processed images to the user. In some examples, a user interface may include at least one of the following: a steering control (e.g., configured for a user to steer at least a portion of the pole or the actuator); a deflector control (e.g., configured for the user to control a deflector); a collector control (e.g., configured for the user to control a collector); an actuator control (e.g., configured for the user to control the actuator; a retriever control configured for the user to control at least one retriever; an ejector control configured for the user to control the ejector; a camera control configured for the user to control a camera; and a display control configured for the user to control a display.

In some examples, the actuator or a portion of pole coupled to an actuator may be configured to be coupled to and decoupled from the pole to swap the actuator for a replacement actuator or a different actuator configured or configurable to fit a different underground component. Actuator control may be manual and/or automated (e.g., by controlling power or a hydraulic or pneumatic valve to provide pressurized fluid or gas to an electric, hydraulic or pneumatic servo). For example, a user may use a display GUI or manually provide force to operate an actuator.

In some examples, an actuator (e.g., valve key) may include a fitting (e.g., a key) configured or configurable to fit an underground component (e.g., a valve nut) of underground equipment (e.g., valve). An actuator may include an ejector configured or configurable to emit pressurized gas or liquid from a port to dislodge (e.g., clean, eject, move) obstructions obstructing the underground component. An actuator may include a retriever (e.g., grip, stab, scoop, magnet) configured or configurable to retrieve obstructions obstructing the underground component. An actuator may include a collector configured or configurable to collect ejected debris. An ejector, retriever and/or camera may be in the interior and/or on the exterior of an actuator (e.g., as shown by examples herein). In some examples, a camera may be recessed or configured to be recessed in the actuator, configured to communicate (wirelessly or by wire) images of underground conditions to a display viewed by a user. In some examples, the actuator may be configured to receive the pressurized gas or liquid through the pole (e.g., if the pole is a pipe). In some examples, an actuator connector may be configured (e.g., with a connector, such as a quick couple) to couple to and decouple from a pole. The pole may be coupled or configured to be coupled between the actuator and a user interface (e.g., handle).

While the disclosed technology has been described with respect to a limited number of examples, it should be understood that they have been presented by way of example only, and not limitation. It will be understood by those skilled in the relevant art(s) that the spirit and scope of the subject matter of the present application encompasses a wide variety of implementations, including various changes in form and details to disclosed examples. Embodiments are not limited to the functional blocks, detailed examples, steps, order or the entirety of subject matter presented in the examples. An embodiment of a device, apparatus or machine may comprise any one or more features described herein in any configuration. An embodiment of a method or process may comprise any process described herein, in any order, with any number of steps, using any modality. The appended claims encompass examples and features described herein, modifications and variations thereto as well as additional examples and features that fall within the true spirit and scope of the disclosed subject matter.

What is claimed:

1. An apparatus comprising:
   an actuator configured or configurable to fit attach to an interface of an operable underground component for operation of the operable underground component;
   a user interface configured or configurable for the user to control the apparatus;
   a pole coupled or configured to be coupled between the user interface and the actuator;
   a camera configured to communicate images of underground conditions to a display viewed by the user; and
   an ejector configured to emit pressurized gas or liquid through a port to dislodge debris obstructing the operable underground component.

2. The apparatus of claim 1, wherein the pole comprises a pipe, and wherein an interior of the pole is configured to convey the pressurized gas or liquid to the ejector.

3. The apparatus of claim 2, wherein the pipe comprises a first segment with a first connector and a second segment with a second connector configured to couple to and decouple from the first connector to assemble and disassemble the first and second segments of the pole.

4. The apparatus of claim 1,
   wherein the user interface comprises at least one of the following:
   a steering control;
   an actuator control;
   a deflector control;
   a retriever control;
   an ejector control;
   a camera control; or
   a display control.

5. The apparatus of claim 1, further comprising at least one of the following:
   a retriever configured to retrieve debris obstructing the operable underground component;
   a deflector that deflects debris ejected above ground by the ejector; and
   a collector that collects debris ejected by the ejector.

6. An apparatus comprising:
   a pole coupled or configured to be coupled between a user interface and an actuator configured or configurable to attach to an interface of an operable underground component for operation of the operable underground component;
   a camera configured to communicate images of underground conditions to a display viewed by the user; and
   at least one of:
     (i) an ejector configured to emit pressurized gas or liquid through a port to dislodge debris obstructing the operable underground component; or
     (ii) a retriever configured to retrieve debris obstructing the operable underground component.

7. The apparatus of claim 6, further comprising:
   the actuator, wherein the actuator comprises the camera and the ejector.

8. The apparatus of claim 6, the apparatus comprising the ejector, wherein the pole comprises a pipe, and wherein an interior of the pipe is configured to convey the pressurized gas or liquid to the ejector.

9. The apparatus of claim 8, wherein the user interface comprises a handle, wherein the handle comprises a pipe, and wherein an interior of the handle is configured to convey the pressurized gas or liquid to the pole.

10. The apparatus of claim 8, wherein the pipe comprises a first segment with a first connector and a second segment with a second connector configured to couple to and decouple from the first connector to assemble and disassemble the first and second segments of the pole.

11. The apparatus of claim 8, wherein the interior of the pipe comprises at least one of a power cable, a communication cable and a control cable.

12. The apparatus of claim 6, further comprising:
    a deflector configured or configurable to deflect debris ejected above ground by the ejector.

13. The apparatus of claim 6, further comprising:
    a collector configured or configurable to collect debris ejected by the ejector.

14. The apparatus of claim 6, wherein the apparatus comprises the retriever.

15. The apparatus of claim 6, further comprising:
    a portable computer mount for a portable computer that performs at least one of the following: powers the camera, processes image data from the camera, and or displays the processed images to the user.

16. The apparatus of claim 6, further comprising:
the user interface, the user interface comprising at least one of the following:
- a steering control;
- a deflector control;
- a retriever control;
- an ejector control;
- a camera control; or
- a display control.

17. An actuator comprising;
a key configured or configurable to attach to an interface of an operable underground component for operation of the operable underground component; and
at least one of:
(i) an ejector configured or configurable to emit pressurized gas or liquid from a port to dislodge obstructions obstructing the operable underground component; or
(ii) a retriever configured or configurable to retrieve obstructions obstructing the operable underground component.

18. The actuator of claim 17, further comprising:
an actuator connector configured to couple to and decouple from a pole coupled or configured to be coupled between the actuator and a user interface.

19. The actuator of claim 17, the actuator comprising the ejector, wherein the actuator is configured to receive the pressurized gas or liquid through the pole.

20. The actuator of claim 17, further comprising:
a camera configured to communicate images of underground conditions to a display viewed by a user.

* * * * *